(12) United States Patent
Irisawa

(10) Patent No.: US 11,716,043 B2
(45) Date of Patent: Aug. 1, 2023

(54) MOTOR CONTROL DEVICE

(71) Applicant: MITSUBA Corporation, Gunma (JP)

(72) Inventor: Kazuki Irisawa, Gunma (JP)

(73) Assignee: MITSUBA Corporation, Gunma (JP)

( * ) Notice: Subject to any disclaimer, the term of this patent is extended or adjusted under 35 U.S.C. 154(b) by 115 days.

(21) Appl. No.: 17/598,857

(22) PCT Filed: Apr. 16, 2020

(86) PCT No.: PCT/JP2020/016647
§ 371 (c)(1),
(2) Date: Sep. 27, 2021

(87) PCT Pub. No.: WO2020/213664
PCT Pub. Date: Oct. 22, 2020

(65) Prior Publication Data
US 2022/0182003 A1    Jun. 9, 2022

(30) Foreign Application Priority Data

Apr. 18, 2019   (JP) ................................. 2019-079067

(51) Int. Cl.
*H02P 27/08* (2006.01)
*B60J 5/06* (2006.01)
(Continued)

(52) U.S. Cl.
CPC ............. *H02P 27/08* (2013.01); *B60J 5/06* (2013.01); *H02P 3/08* (2013.01); *H02P 6/08* (2013.01); *H02P 23/0027* (2013.01)

(58) Field of Classification Search
CPC ...... B25F 5/00; B60J 5/06; H02P 3/08; H02P 6/08; H02P 23/0027; H02P 27/085; H02M 1/38; H02M 7/53871; H02M 7/5395
See application file for complete search history.

(56) References Cited

U.S. PATENT DOCUMENTS

2017/0093321 A1* 3/2017 Ichikawa ................ H02P 27/08

FOREIGN PATENT DOCUMENTS

| CN | 106877753 | 6/2017 |
|----|-----------|--------|
| JP | 2018058143 | 4/2018 |
| JP | 2018107960 | 7/2018 |

OTHER PUBLICATIONS

"Written Opinion of the International Searching Authority (Form PCT/ISA/237) of PCT/JP2020/016647," dated Jul. 14, 2020, with English translation thereof, pp. 1-8.
(Continued)

*Primary Examiner* — Said Bouziane
(74) *Attorney, Agent, or Firm* — JCIPRNET

(57) ABSTRACT

A motor control device including a PWM control part is provided. The PWM control part has a two-phase complementary PWM control part, and when driving opening and closing of an opening/closing body, PWM-controls upper switching elements and lower switching elements of three phases in a three-phase inverter circuit based on an energization mode that sequentially switches among energized phases, which are two of the three phases, and a non-energized phase, which is a remaining one phase. The two-phase complementary PWM control part, in one of the energized phases, controls one of the upper switching element and the lower switching element by a PWM signal, and controls the other by a complementary PWM signal having a polarity opposite to the PWM signal, and, in the non-energized phase, controls one of the upper switching element and the lower switching element to be off, and controls the other by the complementary PWM signal.

9 Claims, 21 Drawing Sheets

(51) Int. Cl.
*H02P 3/08* (2006.01)
*H02P 6/08* (2016.01)
*H02P 23/00* (2016.01)

(56) References Cited

OTHER PUBLICATIONS

"International Search Report (Form PCT/ISA/210) of PCT/JP2020/016647," dated Jul. 14, 2020, with English translation thereof, pp. 1-4.

\* cited by examiner (a)

(b)

MOTOR CONTROL DEVICE

CROSS-REFERENCE TO RELATED APPLICATION

This application is a 371 application of the International PCT application serial no. PCT/JP2020/016647, filed on Apr. 16, 2020, which claims the priority benefits of Japan Patent Application No. 2019-079067, filed on Apr. 18, 2019. The entirety of each of the above-mentioned patent applications is hereby incorporated by reference herein and made a part of this specification.

BACKGROUND

Technical Field

The disclosure relates to a motor control device controlling rotation of an electric motor that drives opening and closing of an opening/closing body of a vehicle.

Description of Related Art

Patent Document 1 discloses a motor control device that performs short brake control when a command value of a duty ratio is less than 0% (i.e., in the case of excessive speed), performs complementary PWM control when in the range of 1% to a complementary PWM maximum duty, and performs non-complementary PWM control when in the range of the complementary PWM maximum duty to 100%. In the complementary PWM control, for example, the upper switching element of one of two energized phases is fixed to be on, and the lower switching element and the upper switching element of the other phase are respectively controlled by a PWM signal and a complementary PWM signal. In the non-complementary PWM control, the upper switching element of this other phase is fixed to be off.

RELATED ART

Patent Document(s)

Patent Document 1: Japanese Patent Application Laid-Open No. 2018-107960

SUMMARY

Problems to be Solved

For example, a vehicle such as a one-box car may be mounted with an electric motor that drives opening and closing of a sliding door (opening/closing body) provided on the side portion of the vehicle body, and a motor control device that controls the rotation of the electric motor. The motor control device generally performs speed control so that the power sliding door moves at a predetermined speed as the opening/closing driving is performed. However, for example, when the motor control device drives the power sliding door of the vehicle stopped on an upward slope in an opening direction, the motor control device may not be able to sufficiently suppress acceleration of the power sliding door due to gravity.

Therefore, for example, it is conceivable to increase the braking force at the time of driving opening and closing by using the method shown in Patent Document 1. However, when the slope is steep or when a heavy power sliding door is driven, even if the method as shown in Patent Document 1 is used, there is a risk that the braking force may be insufficient.

The disclosure has been made in view of the above, and one of the objectives thereof is to provide a motor control device capable of performing speed control on an opening/closing body with high accuracy.

Means for Solving the Problems

A motor control device according to the disclosure, which is a motor control device controlling rotation of an electric motor that drives opening and closing of an opening/closing body of a vehicle, includes upper switching elements of three phases, lower switching elements of the three phases, a rotation detection part, a speed control part, and a PWM control part. The upper switching elements of the three phases are respectively connected between a high-potential power supply and output terminals of the three phases connected to the electric motor. The lower switching elements of the three phases are respectively connected between the output terminals of the three phases and a low-potential power supply. The rotation detection part detects a rotation position and a rotation speed of the electric motor. The speed control part outputs a command value of a PWM duty ratio based on an error between the rotation speed detected by the rotation detection part and a predetermined target rotation speed. When driving opening and closing of the opening/closing body, the PWM control part receives the rotation position from the rotation detection part and the command value from the speed control part, and PWM-controls the upper switching elements of the three phases and the lower switching elements of the three phases based on an energization mode that sequentially switches among energized phases, which are two of the three phases, and a non-energized phase, which is a remaining one phase. The PWM control part has a two-phase complementary PWM control part that, in one of the energized phases, controls one of the upper switching element and the lower switching element by a PWM signal, and controls the other by a complementary PWM signal having a polarity opposite to the PWM signal, and, in the non-energized phase, controls one of the upper switching element and the lower switching element to be off, and controls the other by the complementary PWM signal.

In another embodiment of the disclosure, the PWM control part has a one-phase complementary PWM control part that, in one of the energized phases, controls one of the upper switching element and the lower switching element by the PWM signal, and controls the other by the complementary PWM signal, and, in the non-energized phase, controls the upper switching element and the lower switching element to be off.

Another embodiment of the disclosure includes an energization mode control part that, upon receiving the command value from the speed control part, activates the two-phase complementary PWM control part in place of the one-phase complementary PWM control part when an energization-on ratio based on the command value drops lower than a first threshold value, and activates the one-phase complementary PWM control part in place of the two-phase complementary PWM control part when the energization-on ratio exceeds a second threshold value.

In another embodiment of the disclosure, the second threshold value is larger than the first threshold value.

In another embodiment of the disclosure, the PWM control part has a non-complementary PWM control part that, in one of the energized phases, controls one of the upper switching element and the lower switching element by the PWM signal, and controls the other to be off, and, in the non-energized phase, controls the upper switching element and the lower switching element to be off.

Another embodiment of the disclosure includes an energization mode control part that, upon receiving the command value from the speed control part, activates the two-phase complementary PWM control part in place of the one-phase complementary PWM control part when an energization-on ratio based on the command value drops lower than a first threshold value, activates the one-phase complementary PWM control part in place of the two-phase complementary PWM control part when the energization-on ratio exceeds a second threshold value, activates the non-complementary PWM control part in place of the one-phase complementary PWM control part when the energization-on ratio exceeds a third threshold value larger than the second threshold value, and activates the one-phase complementary PWM control part in place of the non-complementary PWM control part when the energization-on ratio drops lower than a fourth threshold value larger than the first threshold value.

In another embodiment of the disclosure, the second threshold value is larger than the first threshold value, and the third threshold value is larger than the fourth threshold value.

A motor control device according to the disclosure, which is a motor control device controlling rotation of an electric motor that drives opening and closing of an opening/closing body of a vehicle, includes upper switching elements of three phases, lower switching elements of the three phases, and a PWM control part. The upper switching elements of the three phases are respectively connected between a high-potential power supply and output terminals of the three phases connected to the electric motor. The lower switching elements of the three phases are respectively connected between the output terminals of the three phases and a low-potential power supply. When fixing a position of the opening/closing body at a position in the middle of opening and closing, by PWM-controlling the upper switching elements of the three phases and the lower switching elements of the three phases based on an energization pattern in which two of the three phases are energized phases, and a remaining one phase is a non-energized phase, the PWM control part fixes a rotation position of the electric motor in a direction corresponding to an energization direction of the energized phases. The PWM control part has a position-fixing PWM control part that, in one of the energized phases, controls one of the upper switching element and the lower switching element by a PWM signal, and controls the other by a complementary PWM signal which has a polarity opposite to the PWM signal, and, in the non-energized phase, controls one of the upper switching element and the lower switching element to be off, and controls the other by the complementary PWM signal.

Another embodiment of the disclosure includes a rotation detection part and a speed control part. The rotation detection part detects the rotation position and a rotation speed of the electric motor. The speed control part outputs a command value of a PWM duty ratio based on an error between the rotation speed detected by the rotation detection part and a predetermined target rotation speed. The PWM control part has a two-phase complementary PWM control part, and when driving opening and closing of the opening/closing body, receives the rotation position from the rotation detection part and the command value from the speed control part, and PWM-controls the upper switching elements of the three phases and the lower switching elements of the three phases based on an energization mode that sequentially switches among the energized phases and the non-energized phase. The two-phase complementary PWM control part, in one of the energized phases, controls one of the upper switching element and the lower switching element by the PWM signal, and controls the other by the complementary PWM signal, and, in the non-energized phase, controls one of the upper switching element and the lower switching element to be off, and controls the other by the complementary PWM signal.

Effects

According to the disclosure, it is possible to perform speed control on the opening/closing body with high accuracy in the motor control device.

Figure 8:
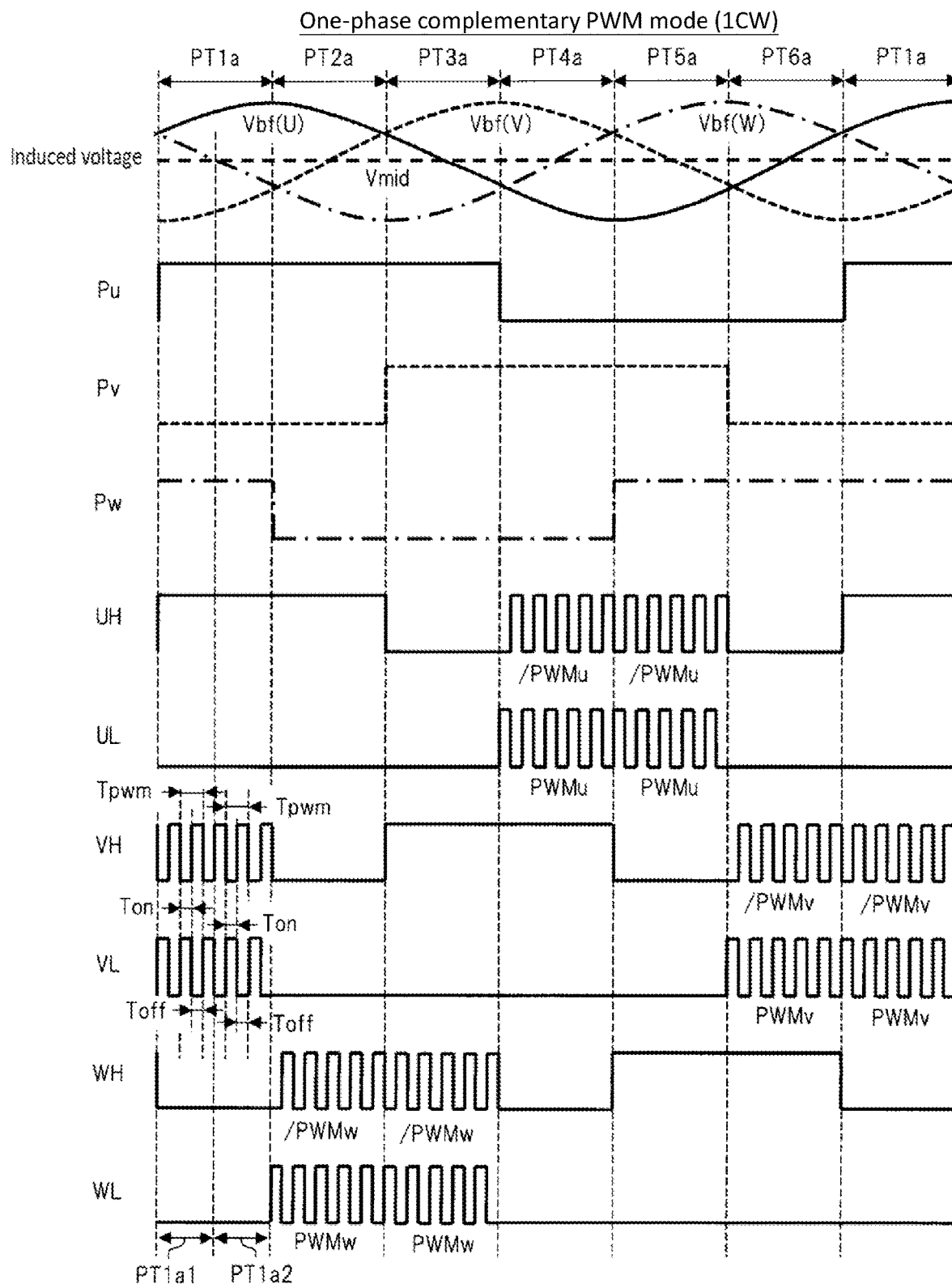
FIG. 8 is a sequence diagram showing an operation example of a one-phase complementary PWM control part in FIG. 7 at the time of CW.
Figure 10:
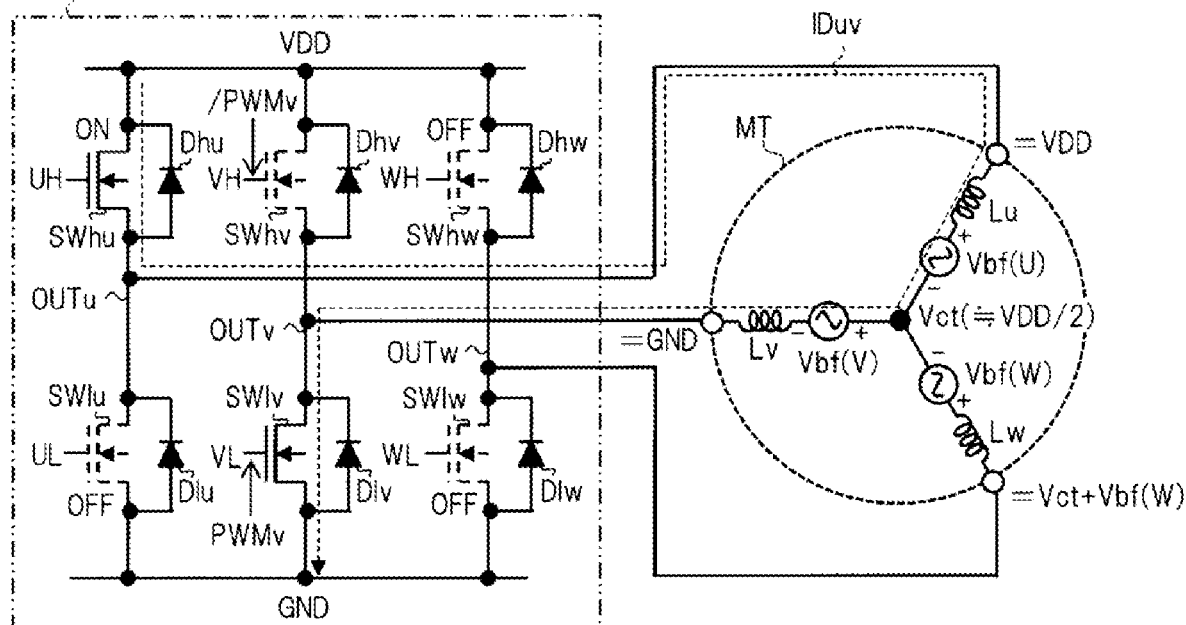
Figure 10:
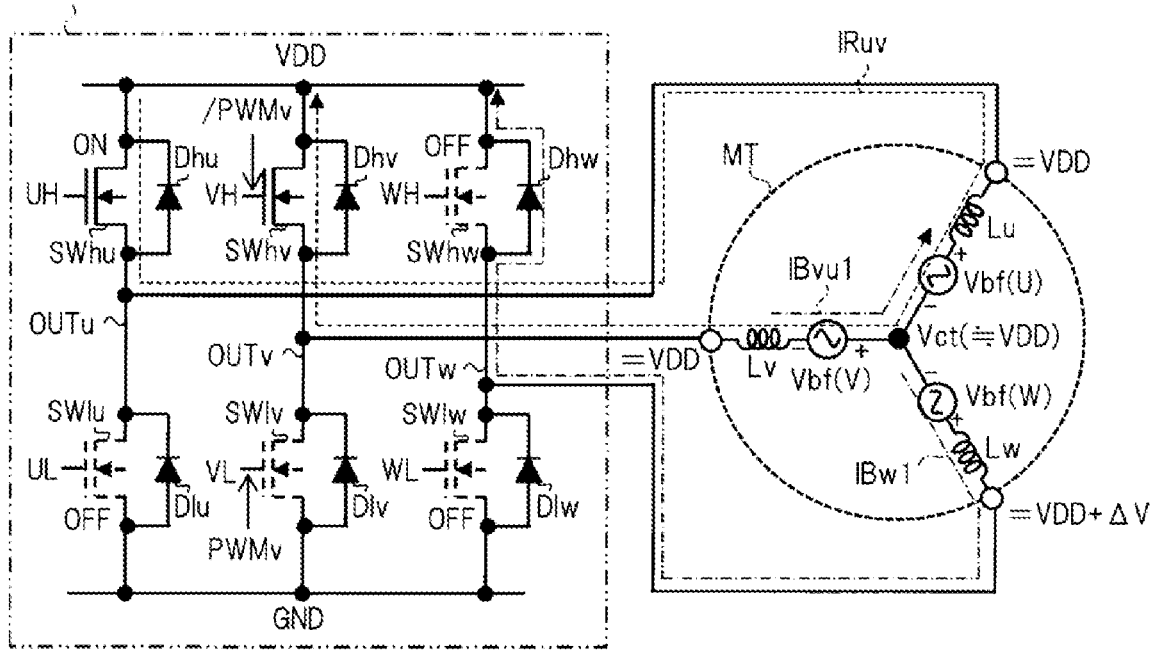

(a) of FIG. 10 is a schematic view showing an operation example in a PWM-on period in FIG. 8, and (b) of FIG. 10 is a schematic view showing an operation example in a PWM-off period in FIG. 8.

Figure 11:
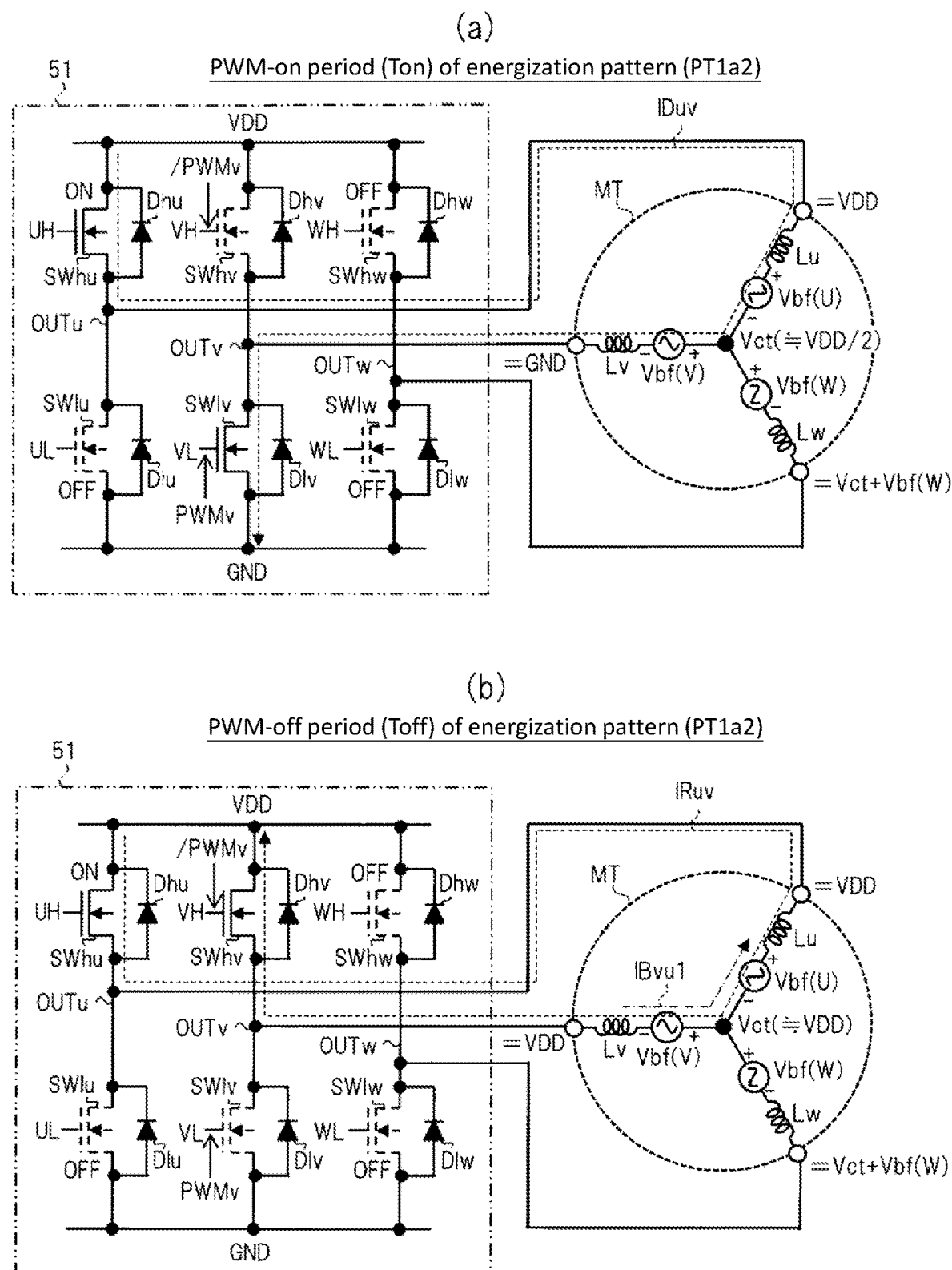

(a) of FIG. 11 is a schematic view showing an operation example in a PWM-on period different from (a) of FIG. 10, and (b) of FIG. 11 is a schematic view showing an operation example in a PWM-off period different from (b) of FIG. 10.

Figure 7:
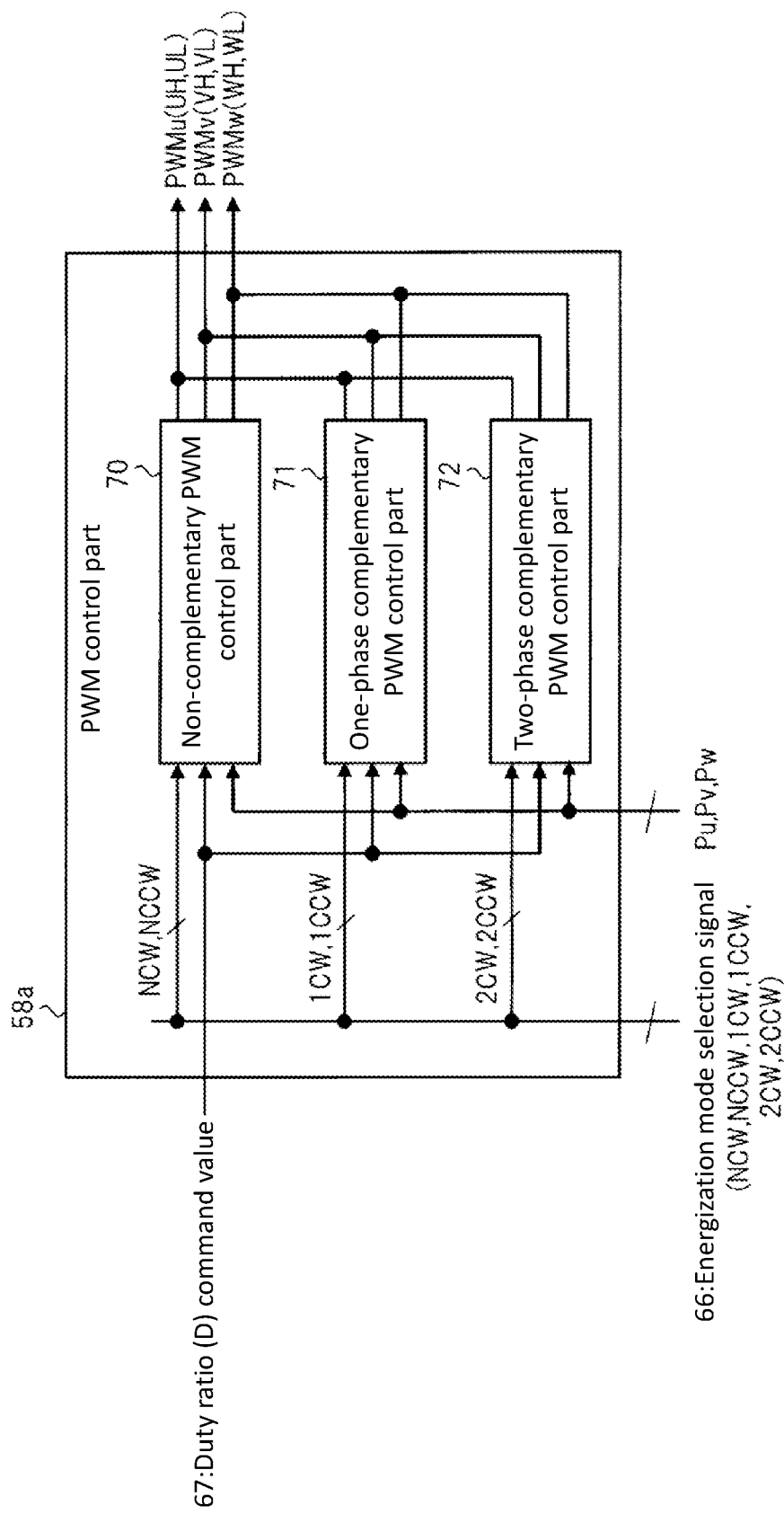
FIG. 7 is a schematic view showing a configuration example of a main part of a PWM control part in FIG. 5.
Figure 12:
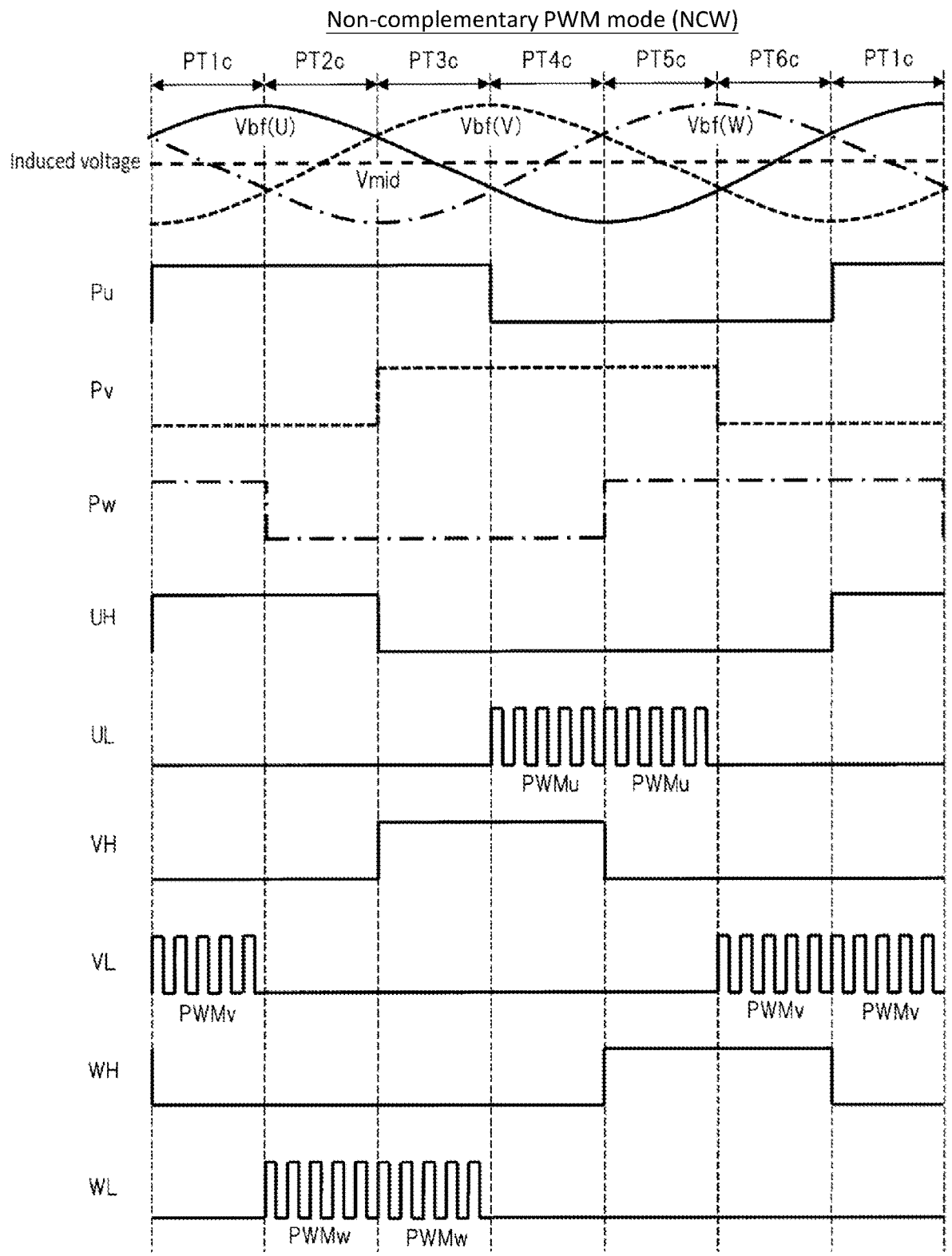

FIG. 12 is a sequence diagram showing an operation example of a non-complementary PWM control part in FIG. 7 at the time of CW.

Figure 13:
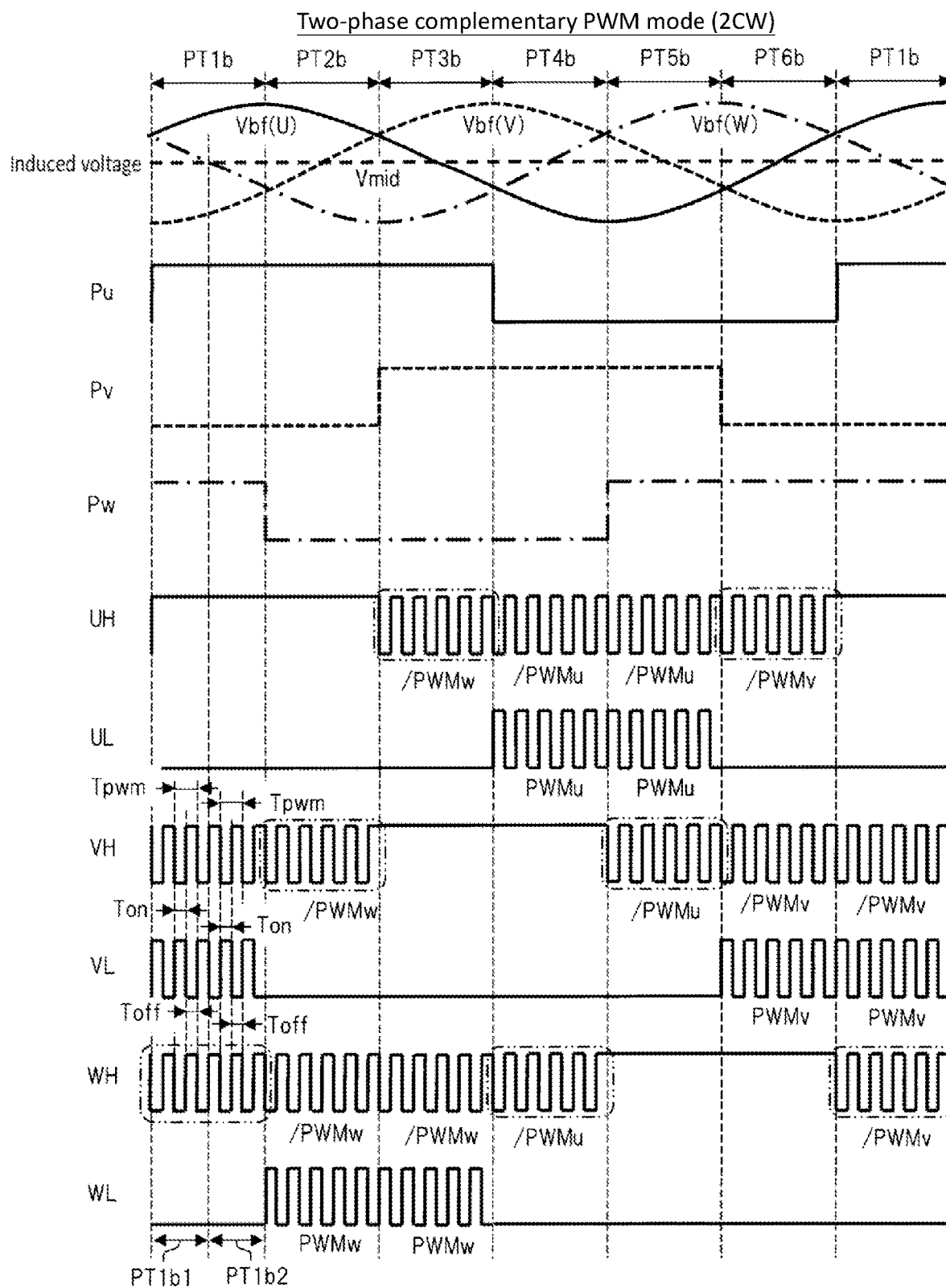

FIG. 13 is a sequence diagram showing an operation example of a two-phase complementary PWM control part in FIG. 7 at the time of CW.

Figure 14:
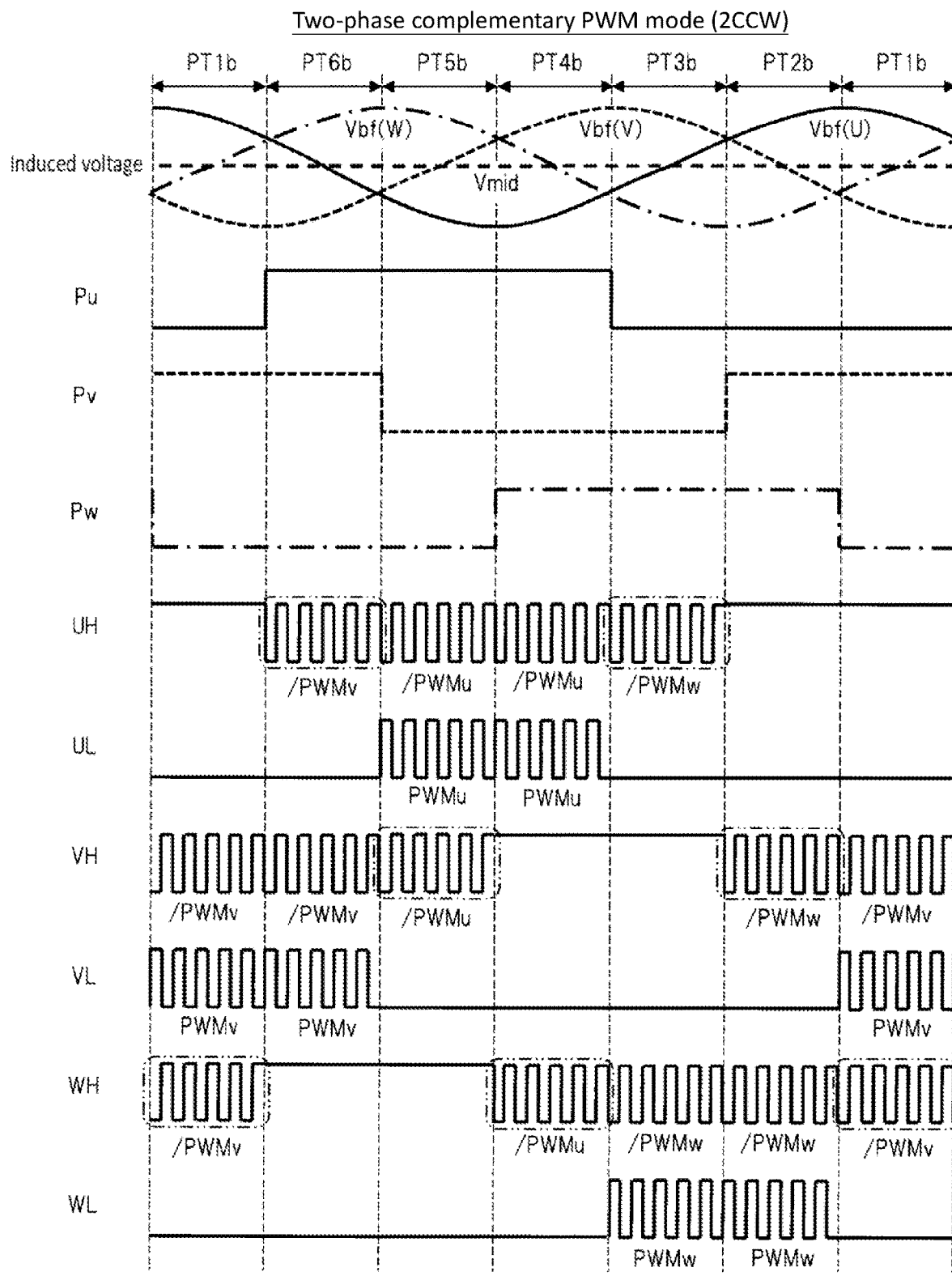

FIG. 14 is a sequence diagram showing an operation example of the two-phase complementary PWM control part in FIG. 7 at the time of CCW.

Figure 15:
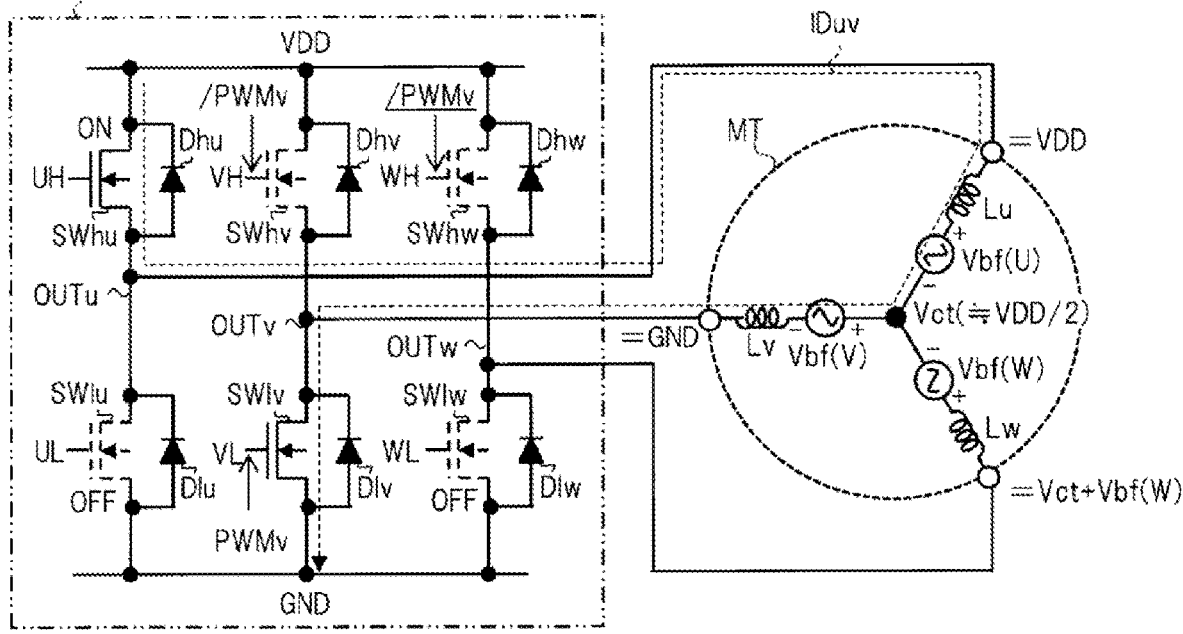
Figure 15:
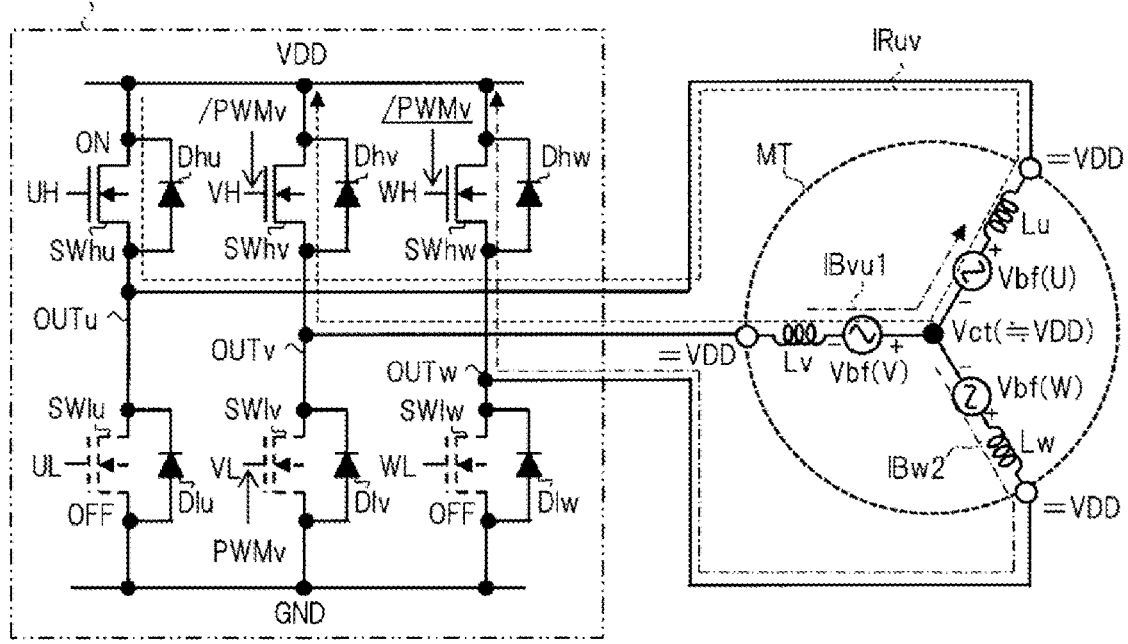

(a) of FIG. 15 is a schematic view showing an operation example in the PWM-on period in FIG. 13, and (b) of FIG. 15 is a schematic view showing an operation example in the PWM-off period in FIG. 13.

Figure 16:
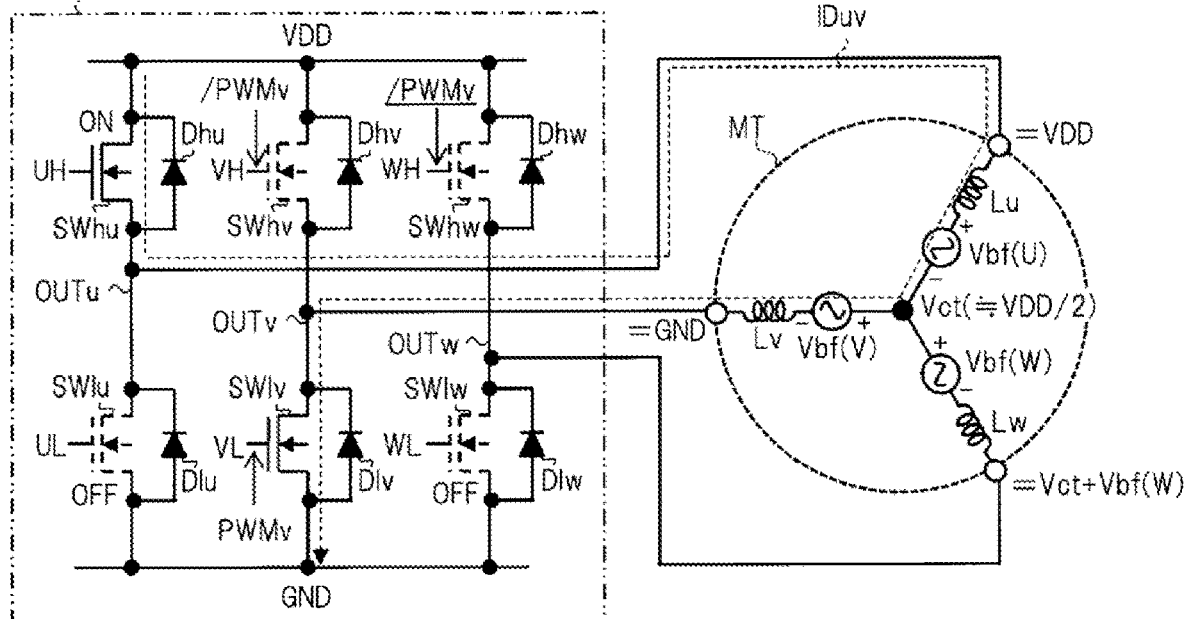
Figure 16:
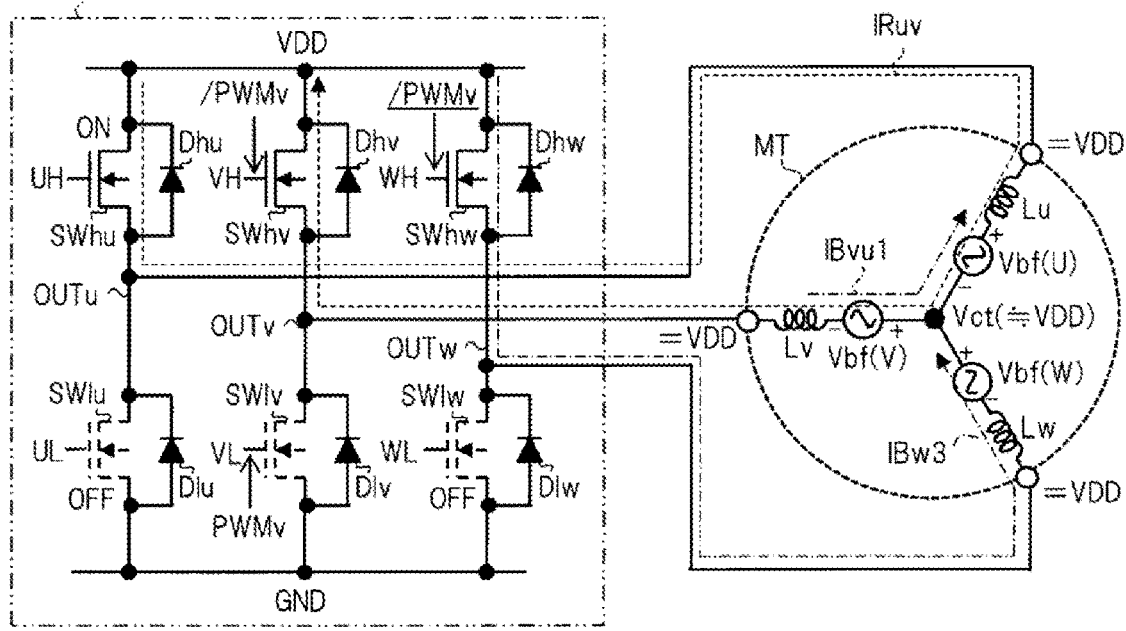

(a) of FIG. 16 is a schematic view showing an operation example in a PWM-on period different from (a) of FIG. 15, and (b) of FIG. 16 is a schematic view showing an operation example in a PWM-off period different from (b) of FIG. 15.

Figure 5:
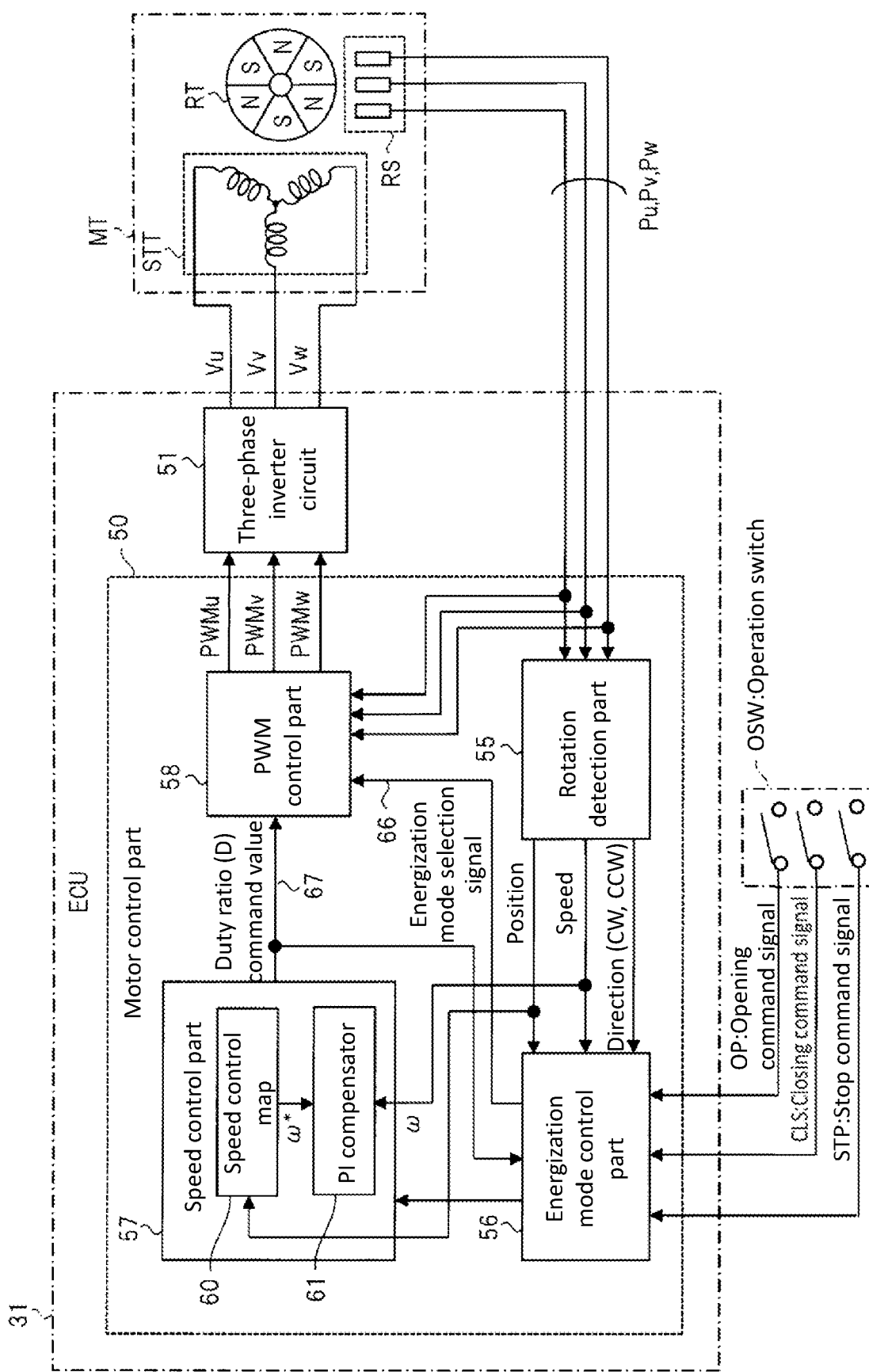
FIG. 5 is a schematic view showing a configuration example of a main part around an ECU in FIG. 2.
Figure 17:
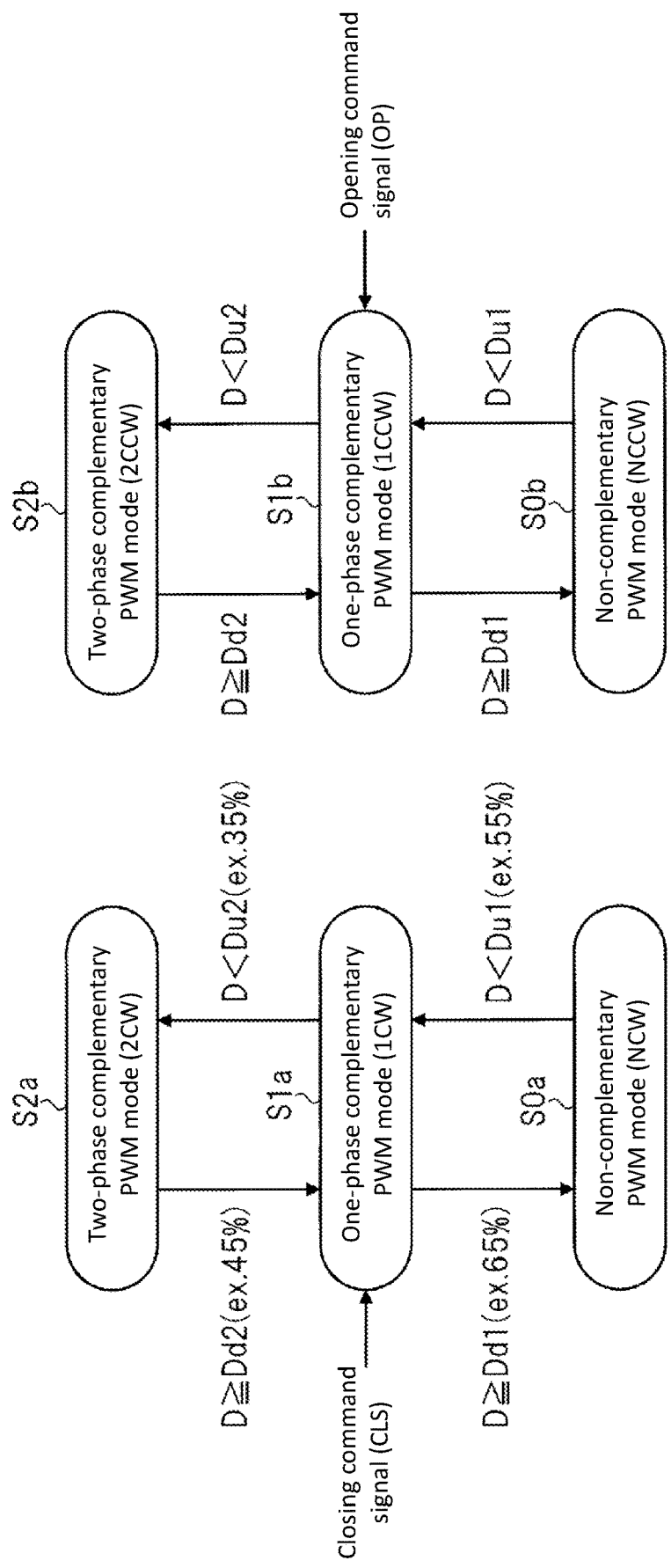

FIG. 17 is a state transition view showing an operation example of a main part of the energization mode control part in FIG. 5.

Figure 18:
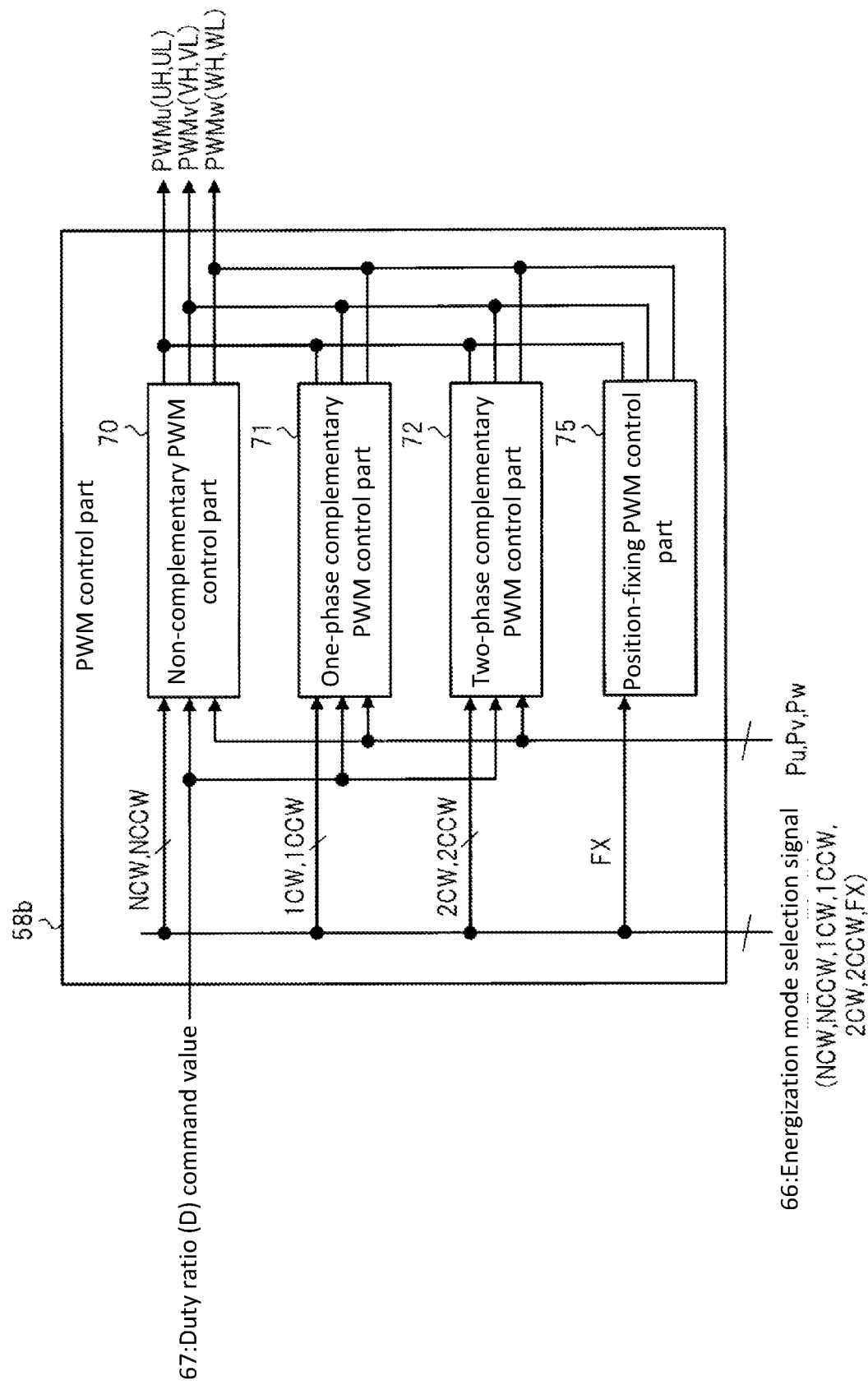

FIG. 18 is a schematic view showing a configuration example of a main part of the PWM control part in FIG. 5 in a motor control device according to Embodiment 2 of the disclosure.

Figure 19:
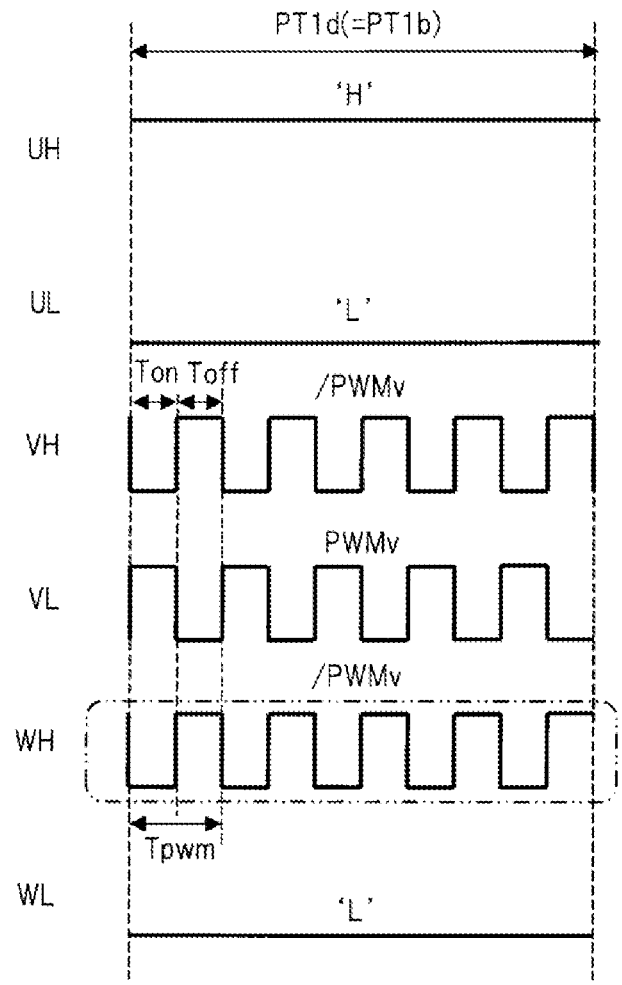
Figure 19:
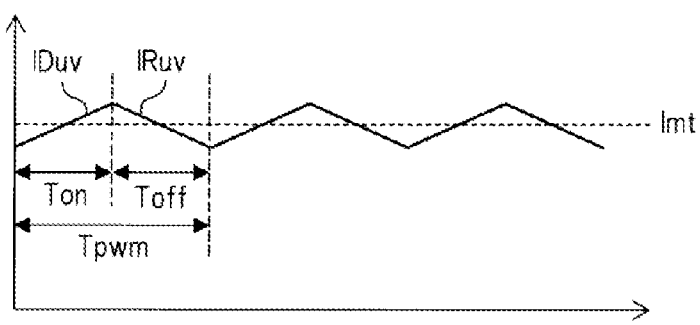

(a) of FIG. 19 is a sequence diagram showing an operation example of a position-fixing PWM control part in FIG. 18, and (b) of FIG. 19 is a schematic view showing an example of the motor current associated with the operation of (a) of FIG. 19.

Figure 20:
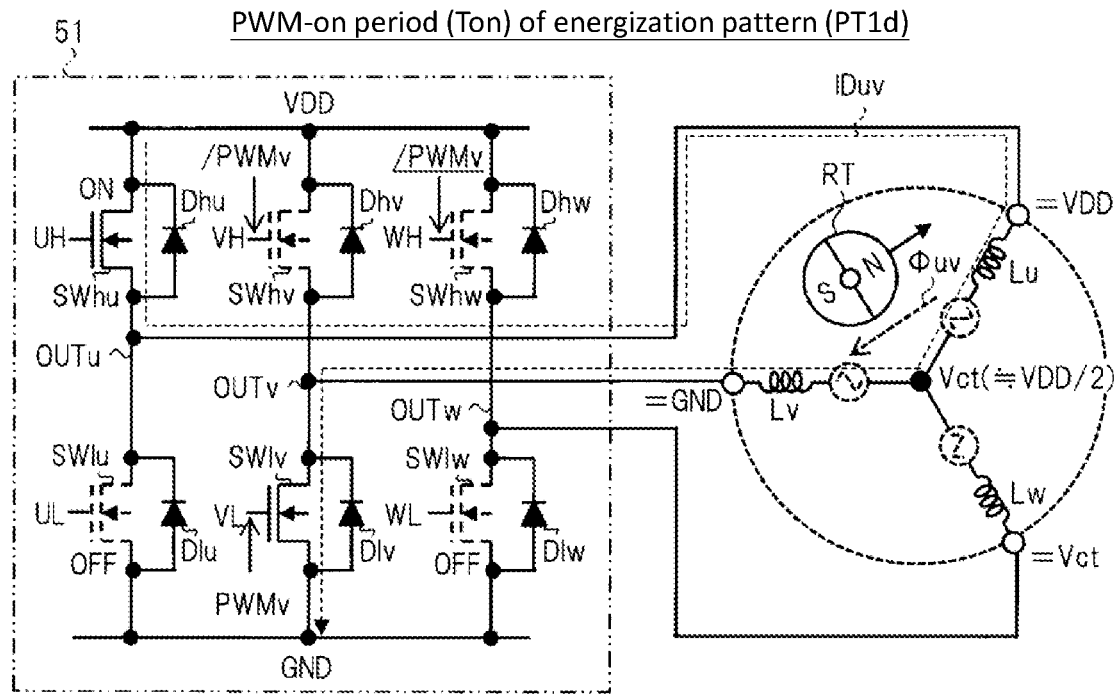
Figure 20:
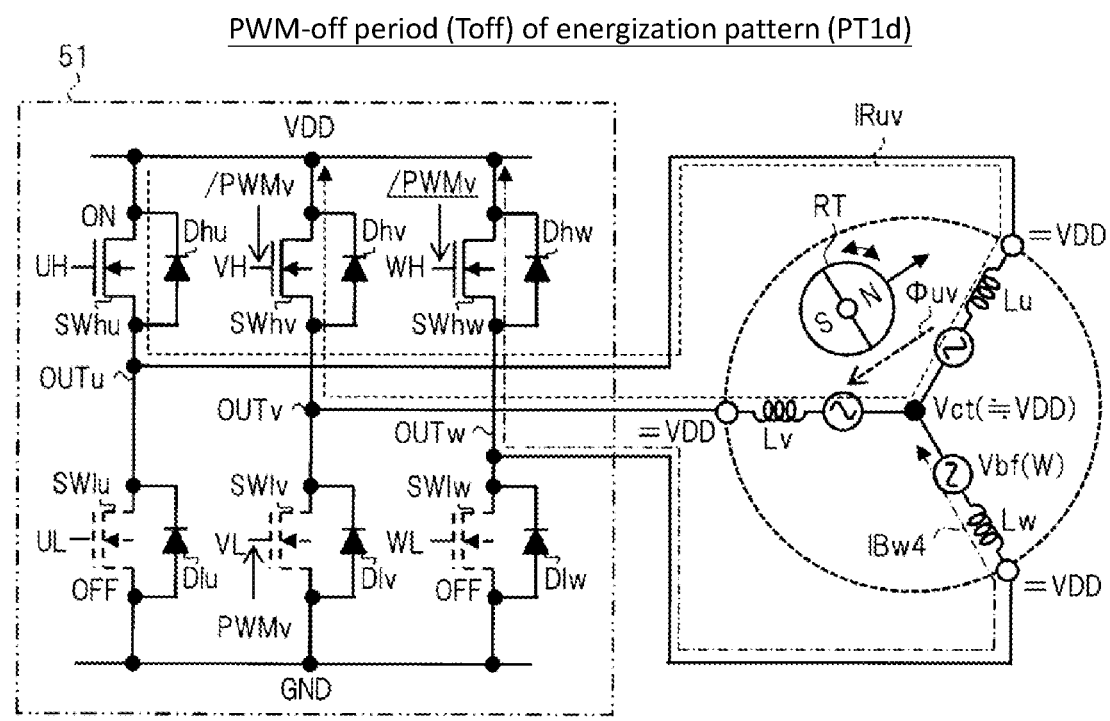

(a) of FIG. 20 is a schematic view showing an operation example in the PWM-on period in (a) and (b) of FIG. 19, and (b) of FIG. 20 is a schematic view showing an operation example in the PWM-off period in (a) and (b) of FIG. 19.

Figure 21:
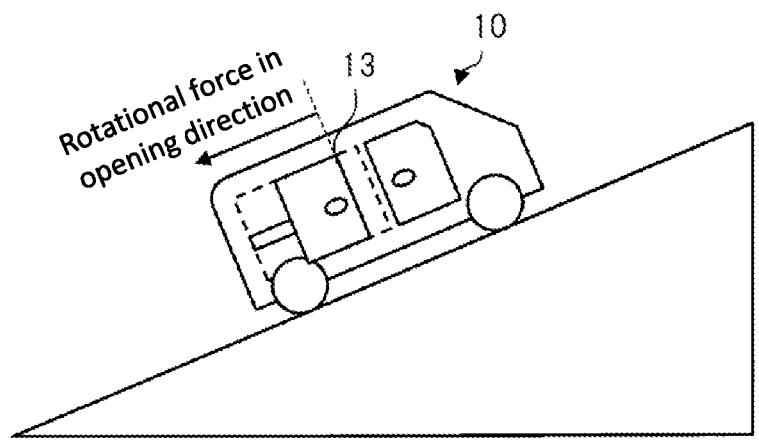
Figure 21:
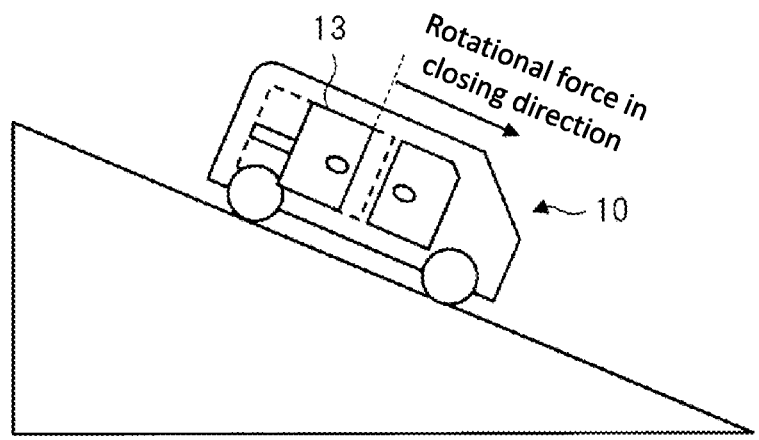

FIG. 21 is a view showing an example of a problem when a motor control device of a comparative example is used.

DESCRIPTION OF THE EMBODIMENTS

Hereinafter, embodiments of the disclosure will be described in detail with reference to the drawings.

Embodiment 1

<Outline of Power Sliding Door Device>

Figure 1:
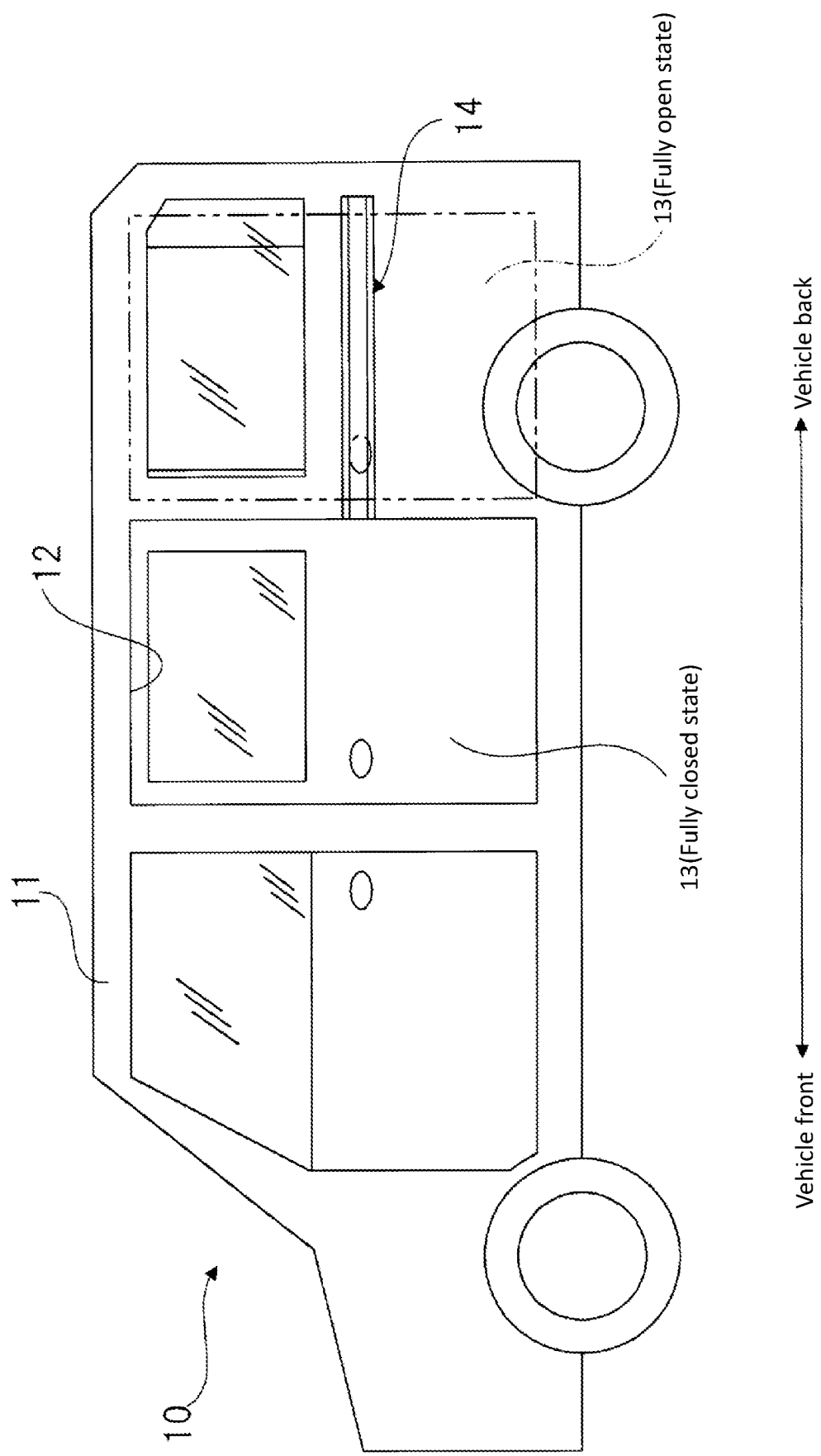
FIG. 1 is a side view showing a schematic configuration example of a vehicle on which a motor control device according to Embodiment 1 of the disclosure is mounted.
Figure 2:
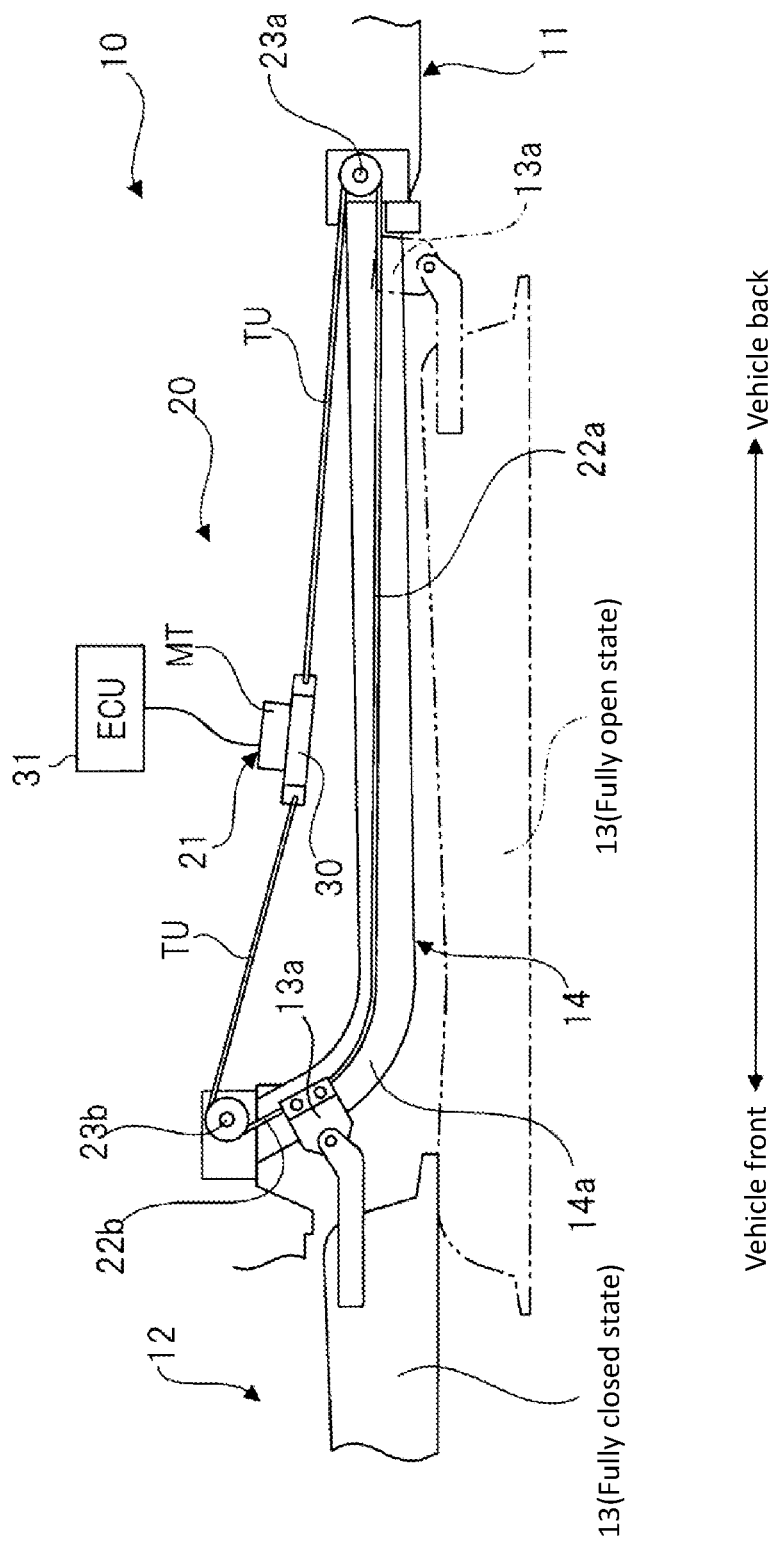
FIG. 2 is a plan view showing a configuration example of a power sliding door device in FIG. 1.

FIG. 1 is a side view showing a schematic configuration example of a vehicle on which a motor control device according to Embodiment 1 of the disclosure is mounted. FIG. 2 is a plan view showing a configuration example of the power sliding door device in FIG. 1. A vehicle 10 shown in FIG. 1 is, for example, a one-box vehicle. A sliding door (opening/closing body) 13 for opening and closing an opening 12 along a guide rail 14 is provided on a side portion of a vehicle body 11 forming the vehicle 10. As shown in FIG. 2, a roller assembly 13a is connected to the sliding door 13. The roller assembly 13a moves together with the sliding door 13 along the guide rail 14 fixed to the side portion of the vehicle body 11.

As a result, as shown in FIG. 1 and FIG. 2, the sliding door 13 opens and closes the opening 12 by moving in the front-rear direction of the vehicle 10 between a "fully closed position" and a "fully open position". Here, as shown in FIG. 2, a retractable part 14a curved toward the vehicle interior side (upper side in the figure) is provided at a portion of the guide rail 14 on the front side of the vehicle 10. By guiding the roller assembly 13a to the retractable part 14a, the sliding door 13 closes the opening 12 and is received on the same surface as the side surface of the vehicle body 11. Specifically, in addition to the guide rail 14 provided at the center portion of the vehicle body 11, guide rails (not shown) are also provided at the upper and lower portions of the vehicle body 11.

In FIG. 2, the vehicle 10 is mounted with a power sliding door device 20 that automatically opens and closes the sliding door 13. In this example, the power sliding door device 20 is a cable-type opening/closing device and includes a driving unit 21, an open-side cable 22a, a closed-side cable 22b, and an electronic control unit (ECU) 31 which is a motor control device. The driving unit 21 is arranged, for example, in the vehicle interior of the vehicle body 11 and at a substantially center portion in the extending direction of the guide rail 14, and drives opening/closing of the sliding door 13 by using an electric motor (hereinafter briefly referred to as a motor) MT. The ECU (motor control device) 31 controls rotation of the motor MT.

The open-side cable 22a and the closed-side cable 22b are both connected to the sliding door 13 via the roller assembly 13a, and function to transmit the power of the driving unit 21 to the sliding door 13. Specifically, the open-side cable 22a is pulled into the driving unit 21 via a first reversing pulley 23a located on the rear side of the vehicle 10, and the closed-side cable 22b is pulled into the driving unit 21 via a second reversing pulley 23b located on the front side of the vehicle 10. Accordingly, the driving unit 21 drives the sliding door 13 in an opening direction by winding the open-side cable 22a, and drives the sliding door 13 in a closing direction by winding the closed-side cable 22b.

Figure 3:
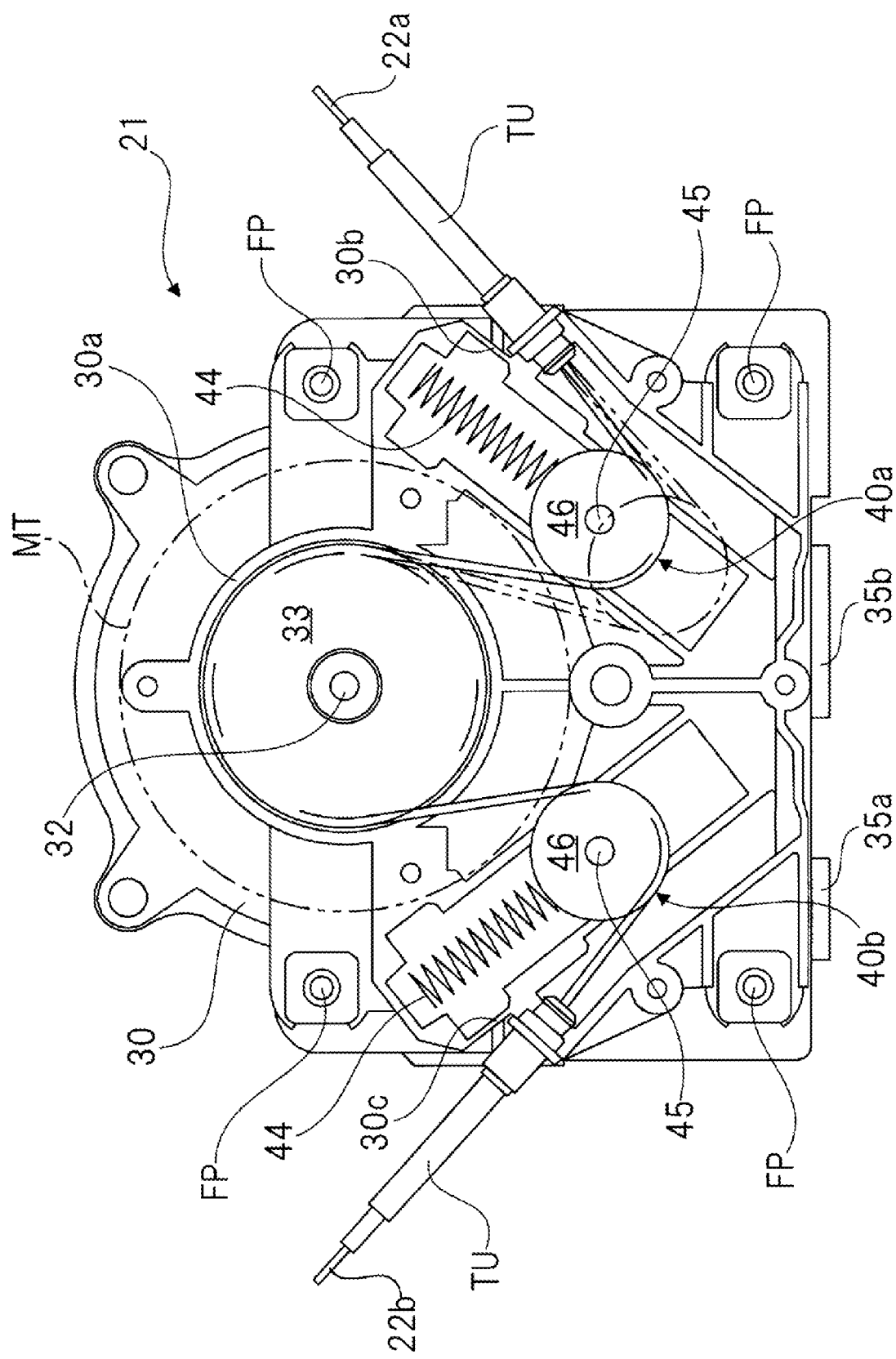
FIG. 3 is a front view showing a configuration example of a driving unit in FIG. 2.
Figure 4:
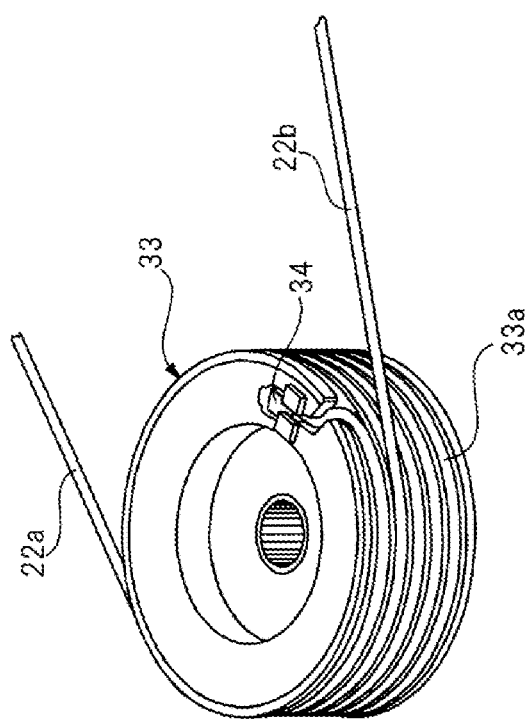
FIG. 4 is a perspective view showing a configuration example of a drum in FIG. 3.

FIG. 3 is a front view showing a configuration example of the driving unit in FIG. 2, and FIG. 4 is a perspective view showing a configuration example of a drum in FIG. 3. The driving unit 21 shown in FIG. 3 includes a case 30 made of a resin material such as plastic. The case 30 also functions as a frame that supports each member or mechanism forming the driving unit 21. The driving unit 21 is fixed to the vehicle body 11 (see FIG. 1 and FIG. 2) with bolts or the like (not shown) via four fixing parts FP provided at the case 30.

The case 30 is provided with a motor MT which is a power source of the driving unit 21. The motor MT is, for example, a flat brushless motor that can rotate in forward and reverse directions. By using the brushless motor, it is possible to suppress an increase in the thickness dimension of the driving unit 21. A reduction mechanism (not shown) composed of a planetary gear reducer is provided inside the case 30 and in the vicinity of the motor MT. The reduction mechanism increases the torque by decelerating the rotation of the motor MT at a predetermined ratio, and rotates an output shaft 32 by this driving force of increased torque. Further, a drum housing chamber 30a formed in a substantially cylindrical shape is provided at a substantially center portion of the case 30. The drum housing chamber 30a is arranged coaxially with respect to the motor MT, and a drum 33 is rotatably housed inside the drum housing chamber 30a.

As shown in FIG. 4, the drum 33 is formed in a substantially columnar shape having a guide groove 33a in a spiral shape provided on the outer peripheral surface, and its axis is fixed to the output shaft 32 protruding into the drum housing chamber 30a. One end of the open-side cable 22a (the same applies to the closed-side cable 22b) is fixed to the drum 33 by a locking block 34. When the drum 33 rotates counterclockwise (in a CCW direction), the open-side cable 22a is wound along the guide groove 33a from one side in the axial direction. When the drum 33 rotates clockwise (CW direction), the closed-side cable 22b is wound along the guide groove 33a from another side in the axial direction.

In FIG. 3, a board housing chamber (not shown) is provided at a portion on the back side of the drum housing chamber 30a, at a portion (lower portion in the figure) close to an open-side tensioner mechanism 40a and a closed-side tensioner mechanism 40b. A control board that controls the rotation of the motor MT and corresponds to the ECU (motor control device) 31 of FIG. 2 is housed in the board housing chamber. The control board (ECU 31) is electrically connected to a battery (power supply) mounted on the vehicle 10, an operation switch in the vehicle interior, and the like via connector connecting parts 35a and 35b.

Here, the control board (ECU 31) drives the motor MT to rotate counterclockwise (in the CCW direction) according to an "open operation" of the operation switch. Accordingly, the output shaft 32 and the drum 33 rotate counterclockwise at a high torque, and the open-side cable 22a is wound around the drum 33 while towing the sliding door 13. As a result, the sliding door 13 is automatically controlled in the opening direction. At this time, the closed-side cable 22b is sent out from the drum 33 to the outside of the case 30.

Similarly, the control board (ECU 31) drives the motor MT to rotate clockwise (in the CW direction) according to a "close operation" of the operation switch. Accordingly, the output shaft 32 and the drum 33 rotate clockwise at a high torque, and the closed-side cable 22b is wound around the drum 33 while towing the sliding door 13. As a result, the sliding door 13 is automatically controlled in the closing direction. At this time, the open-side cable 22a is sent out from the drum 33 to the outside of the case 30. In addition, the cables 22a and 22b are covered with a flexible outer tube TU in a segment between the entrance/exit of the driving unit 21 and the reversing pulleys 23a and 23b (see FIG. 2) and move inside it.

The case 30 is provided with an open-side tensioner housing chamber 30b and a closed-side tensioner housing chamber 30c adjacent to the drum housing chamber 30a. The open-side tensioner housing chamber 30b and the closed-side tensioner housing chamber 30c respectively house the open-side tensioner mechanism 40a and the closed-side tensioner mechanism 40b which apply a predetermined tension to the open-side cable 22a and the closed-side cable 22b. Each of the open-side tensioner mechanism 40a and the closed-side tensioner mechanism 40b includes a pulley 46 that rotates on a pulley axis 45 and a coil spring (elastic member) 44 that presses the pulley 46.

The open-side cable 22a is wrapped on the pulley 46 of the open-side tensioner mechanism 40a and then wound around the drum 33. Similarly, the closed-side cable 22b is wrapped on the pulley 46 of the closed-side tensioner mechanism 40b and then wound around the drum 33. At this time, the open-side tensioner mechanism 40a and the closed-side tensioner mechanism 40b eliminate the slack of the open-side cable 22a and the closed-side cable 22b by respectively pressing the pulley 46 by the coil spring 44. For example, the cable lengths of the cables 22a and 22b may be extended due to repeated towing of a heavy sliding door 13. The tensioner mechanisms 40a and 40b eliminate the slack caused by the extension of the cable length.

<Outline Around ECU (Motor Control Device)>

Figure 6:
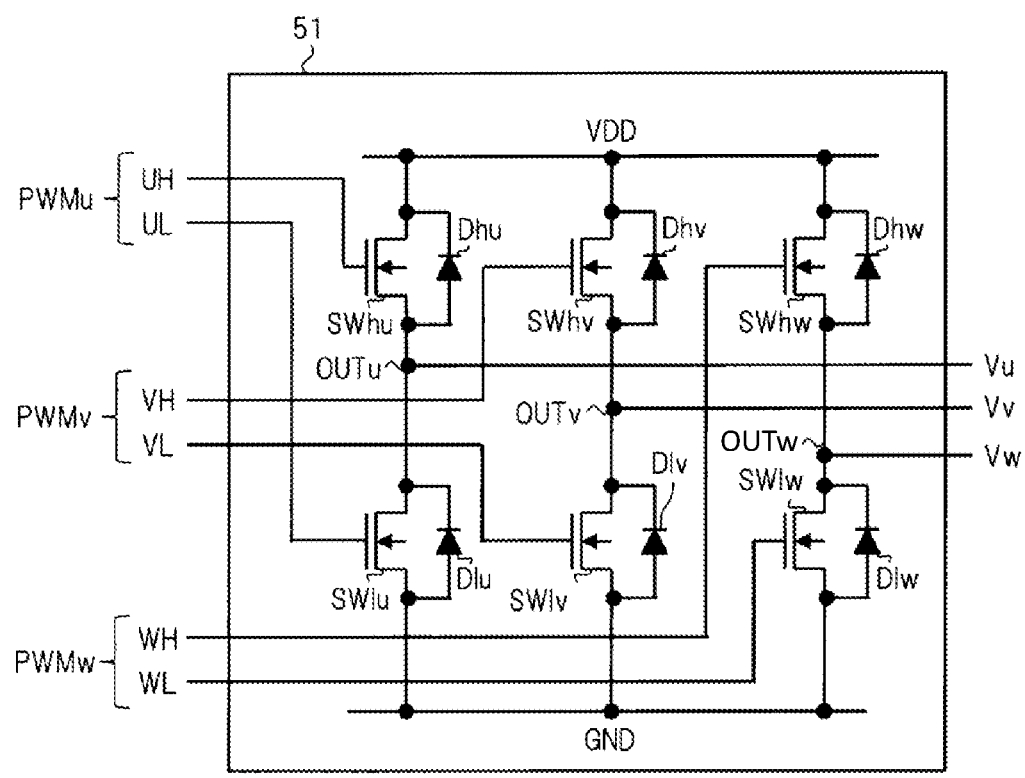
FIG. 6 is a circuit diagram showing a configuration example of a three-phase inverter circuit in FIG. 5.

FIG. 5 is a schematic view showing a configuration example of a main part around the ECU in FIG. 2. FIG. 6 is a circuit diagram showing a configuration example of a three-phase inverter circuit in FIG. 5. FIG. 7 is a schematic view showing a configuration example of a main part of a PWM control part in FIG. 5. The ECU (motor control device) 31 shown in FIG. 5 includes a motor control part 50 and a three-phase inverter circuit (motor driver) 51. As shown in FIG. 6, the three-phase inverter circuit 51 has three phases (u-phase, v-phase, and w-phase) of upper switching elements SWhu, SWhv, and SWhw and freewheeling diodes Dhu, Dhv, and Dhw, and three phases of lower switching element SWlu, SWlv, and SWlw and freewheeling diodes Dlu, Dlv, and Dlw.

The upper switching elements SWhu, SWhv, and SWhw of the three phases are respectively connected between a high-potential power supply VDD and output terminals OUTu, OUTv, and OUTw of the three phases connected to the motor MT. The lower switching elements SWlu, SWlv, and SWlw of the three phases are respectively connected between the output terminals OUTu, OUTv, and OUTw of the three phases and a low-potential power supply GND. In the specification, the upper switching elements SWhu, SWhv, and SWhw are collectively referred to as upper switching elements SWh, and the lower switching elements SWlu, SWlv, and SWlw are collectively referred to as lower switching elements SWl.

Each of the upper switching elements SWh and the lower switching elements SWl is composed of, for example, an n-channel metal oxide semiconductor field effect transistor (MOSFET), an n-channel insulated gate bipolar transistor (IGBT), or the like. The freewheeling diodes Dhu, Dhv, and Dhw are respectively connected antiparallel to the upper switching elements SWhu, SWhv, and SWhw, and the freewheeling diodes Dlu, Dlv, and Dlw are respectively connected antiparallel to the lower switching elements SWlu, SWlv, and SWlw. Each of the freewheeling diodes may be implemented, for example, by a parasitic diode of the corresponding switching element, or by an external Schottky barrier diode or the like.

The upper switching element SWhu and the lower switching element SWlu of the u-phase are respectively controlled to be on/off by switching signals UH and UL, which are pulse width modulation (PWM) signals PWMu of the u-phase, to output a driving voltage Vu to the output terminal OUTu of the u-phase. Similarly, the switching elements SWhv and SWlv of the v-phase each output a driving voltage Vv to the output terminal OUTv according to switching signals VH and VL, which are PWM signals PWMv of the v-phase, and the switching elements SWhw and SWlw of the w-phase each output a driving voltage Vw to the output terminal OUTw according to switching signals WH and WL, which are PWM signals PWMw of the w-phase.

In FIG. 5, by generating PWM signals for generating the driving voltages Vu, Vv, and Vw of the three phases according to a signal from an operation switch OSW, the motor control part 50 controls the rotation of the motor MT and controls the driving unit 21. According to a user operation, the operation switch OSW outputs an opening command signal OP for moving the sliding door 13 in the opening direction, a closing command signal CLS for moving the sliding door 13 in the closing direction, or a stop command signal STP for stopping the sliding door 13 in the middle of opening and closing. Specifically, the operation switch OSW is a switch in the vicinity of the driver's seat or a remote control switch.

The motor control part 50 is composed of, for example, a microcontroller including a central processing unit (CPU) or the like, and is mounted on a wiring board (control board) constituting the ECU 31 together with the three-phase inverter circuit 51. However, the motor control part 50 is not limited to the microcontroller, and a part or all of the motor control part 50 may be composed of a field programmable gate array (FPGA), dedicated hardware, or the like. In other words, the motor control part 50 may be composed of program processing by the CPU, hardware processing by the dedicated hardware, or a combination thereof.

The motor MT includes a rotor RT, a stator STT that generates a magnetic force for rotating the rotor RT, and a rotation angle sensor RS that detects a rotation position (rotation angle) of the rotor RT. The rotation angle sensor RS is typically a Hall element or the like that generates position detection signals Pu, Pv, and Pw of the three phases according to the rotation position of the rotor RT. However, the rotation angle sensor RS is not particularly limited thereto and may be a resolver or the like.

The motor control part 50 includes a rotation detection part 55, an energization mode control part 56, a speed control part 57, and a PWM control part 58. The rotation detection part 55 detects a rotation position, a rotation speed, and a rotation direction of the motor MT based on a cycle number, a frequency, a phase difference, etc. of the position detection signals Pu, Pv, and Pw from the rotation angle sensor RS, and by extension, detects a door position, a door moving speed, and a door opening/closing direction of the sliding door 13. In other words, the rotation detection part 55 functions, together with the rotation angle sensor RS, as a rotation detection sensor that detects a door position and a door moving speed of the sliding door (opening/closing body) 13. The door position is outputted as, for example, a count value.

The speed control part 57 has a speed control map 60 and a proportional-integral (PI) compensator 61, and controls the rotation speed of the motor MT, and by extension, the moving speed when driving opening and closing of the sliding door (opening/closing body) 13. The speed control map 60 includes in advance stored data that define the correspondence between the door position (e.g., a count value) of the sliding door 13 and a door target moving speed (target rotation speed of the motor MT) $\omega^*$, receives the door position from the rotation detection part 55, and outputs a corresponding door target moving speed (target rotation speed of the motor MT) $\omega^*$.

Based on an error between a door moving speed (rotation speed of the motor MT) co detected by the rotation detection part 55 and the door target moving speed (target rotation speed of the motor MT) $\omega^*$ from the speed control map 60, the PI compensator 61 calculates a PWM duty ratio (D) for approximating the error to zero by proportional-integral calculation. Then, the PI compensator 61 outputs a command value 67 of the calculated PWM duty ratio (D) to the PWM control part 58 and also to the energization mode control part 56.

Although details will be described later, the energization mode control part 56 determines one energization mode from a plurality of energization modes based on the signal from the operation switch OSW and the command value 67 from the speed control part 57, and outputs an energization mode selection signal 66 indicating the energization mode to the PWM control part 58. Further, although details are omitted, the energization mode control part 56 is also responsible for monitoring and controlling the entirety of the motor control part 50, including abnormality monitoring of each detection signal from the rotation detection part 55.

The PWM control part 58 receives the position detection signals Pu, Pv, and Pw from the rotation angle sensor (rotation detection sensor) RS and the command value 67 from the speed control part 57, and PWM-controls each of the switching elements in the three-phase inverter circuit 51 by the PWM signals PWMu, PWMv, and PWMw based on the energization mode indicated by the energization mode selection signal 66 from the energization mode control part 56. As the energization mode when driving opening and closing of the sliding door (opening/closing body) 13, the PWM control part 58 uses a so-called 120° energization mode that sequentially switches among energized phases, which are two of the three phases, and a non-energized phase, which is the remaining one phase.

Specifically, the PWM control part 58, as shown in a PWM control part 58a of FIG. 7, has a non-complementary PWM control part 70, a one-phase complementary PWM control part 71, and a two-phase complementary PWM control part 72. The PWM control part 58a receives six activation signals NCW, NCCW, 1CW, 1CCW, 2CW, and 2CCW as the energization mode selection signal 66 from the energization mode control part 56. The non-complementary PWM control part 70 is activated when either one of the two activation signals NCW and NCCW is received. The one-phase complementary PWM control part 71 is activated when either one of the two activation signals 1CW and 1CCW is received. The two-phase complementary PWM control part 72 is activated when either one of the two activation signals 2CW and 2CCW is received.

Although details will be described in FIG. 12, in one of the two energized phases in the 120° energization mode, the non-complementary PWM control part 70 controls one of the upper switching element SWh and the lower switching element SWl by the PWM signal, and controls the other to be off. Further, in the one non-energized phase in the 120° energization mode, the non-complementary PWM control part 70 controls the upper switching element SWh and the lower switching element SWl to be off. The activation signal NCW is outputted when the motor MT is rotated clockwise (CW direction) using such an energization mode, and the activation signal NCCW is outputted when the motor MT is rotated counterclockwise (CCW direction).

Although details will be described in FIG. 8 and FIG. 9, in one of the two energized phases in the 120° energization mode, the one-phase complementary PWM control part 71 controls one of the upper switching element SWh and the lower switching element SWl by the PWM signal, and different from the case of the non-complementary PWM control part 70, controls the other by a complementary PWM signal which is the opposite polarity of the PWM signal. Further, in the non-energized phase, similar to the case of the non-complementary PWM control part 70, the one-phase complementary PWM control part 71 controls the upper switching element SWh and the lower switching element SWl to be off. The activation signal 1CW is outputted when the motor MT is rotated in the CW direction using such an energization mode, and the activation signal 1CCW is outputted when the motor MT is rotated in the CCW direction.

Although details will be described in FIG. 13 and FIG. 14, in one of the two energized phases in the 120° energization mode, similar to the case of the one-phase complementary PWM control part 71, the two-phase complementary PWM control part 72 controls one of the upper switching element SWh and the lower switching element SWl by the PWM signal, and controls the other by the complementary PWM signal. Further, in the non-energized phase, different from the case of the one-phase complementary PWM control part 71, the two-phase complementary PWM control part 72 controls one of the upper switching element and the lower switching element to be off, and controls the other by the complementary PWM signal. The activation signal 2CW is outputted when the motor MT is rotated in the CW direction using such an energization mode, and the activation signal 2CCW is outputted when the motor MT is rotated in the CCW direction.

<Operation of One-Phase Complementary PWM Control Part>

FIG. 8 is a sequence diagram showing an operation example of the one-phase complementary PWM control part in FIG. 7 at the time of CW. FIG. 9 is a sequence diagram showing an operation example of the one-phase complementary PWM control part in FIG. 7 at the time of CCW. The one-phase complementary PWM control part 71 performs the operation of FIG. 8 when receiving the activation signal 1CW, and performs the operation of FIG. 9 when receiving the activation signal 1CCW. Generally, in the 120° energization mode, as shown in FIG. 8, six energization patterns PT1a to PT6a are predetermined by the combination of the two energized phases and the one non-energized phase, and the six energization patterns PT1a to PT6a are sequentially switched according to the position detection signals Pu, Pv, and Pw.

For example, in FIG. 8, the one-phase complementary PWM control part 71 selects the energization pattern PT1a in which the u-phase and the v-phase are the energized phases and the w-phase is the non-energized phase according to a rising edge of the position detection signal Pu. Further, the one-phase complementary PWM control part 71 selects the energization pattern PT2a in which the u-phase and the w-phase are the energized phases and the v-phase is the non-energized phase according to a falling edge of the position detection signal Pw generated after an electric angle of 60° from the rising edge of the position detection signal Pu at the time of CW.

Further, the one-phase complementary PWM control part 71 selects the energization pattern PT3a in which the v-phase and the w-phase are the energized phases and the u-phase is the non-energized phase according to a rising edge of the position detection signal Pv generated after an electric angle of 60° from the falling edge of the position detection signal Pw at the time of CW. Afterwards, while switching the energized phases and the non-energized phase in the same manner, the energization pattern PT4a is selected according to a falling edge of the position detection signal Pu, the energization pattern PT5a is selected according to a rising edge of the position detection signal Pw, and the energization pattern PT6a is selected according to a falling edge of the position detection signal Pv.

Here, in each of the energization patterns PT1a to PT6a, the one-phase complementary PWM control part 71 controls the upper switching element SWh in one of the two energized phases to be on, and controls the lower switching element SWl and the upper switching element SWh in the remaining one phase respectively by the PWM signal and the complementary PWM signal. Further, in each of the energization patterns PT1a to PT6a, the one-phase complementary PWM control part 71 controls the upper switching element SWh and the lower switching element SWl of the non-energized phase to be both off.

Taking the energization pattern PT1a as an example, the one-phase complementary PWM control part 71 controls the upper switching element SWhu of the u-phase, which is the energized phase (u-phase→v-phase), to be on by the switching signal UH which becomes an "H" level, and PWM-controls the lower switching element SWlv of the v-phase, which is the driving side of the energized phase, by the switching signal VL which is the PWM signal PWMv. Further, the one-phase complementary PWM control part 71 PWM-controls the upper switching element SWhv of the v-phase, which is the return side of the energized phase, by the switching signal VH which is a complementary PWM signal (/PWMv).

At this time, the one-phase complementary PWM control part 71 determines the PWM duty ratio (D), which is a ratio of a PWM-on period Ton (energization-on) in a PWM cycle Tpwm, based on the command value 67 of the PWM duty ratio (D) from the speed control part 57. Further, the one-phase complementary PWM control part 71 controls the upper switching element SWhw and the lower switching element SWlw of the w-phase, which is the non-energized phase, to be off by the switching signal WH and the switching signal WL, both of which become an "L" level.

The one-phase complementary PWM control part 71 (the same applies to the non-complementary PWM control part 70 and the two-phase complementary PWM control part 72) is implemented by, for example, a timer (counter) or the like when the microcontroller or the like is used. Further, in the example of FIG. 8, in the energized phases, the upper switching element SWh of one phase is controlled to be on, and the lower switching element SWl of the other phase is controlled by the PWM signal; however, it is also possible that the lower switching element SWl of one phase may be controlled to be on, and the upper switching element SWh of the other phase may be controlled by the PWM signal. In that case, the lower switching element SWl of the other phase is controlled by the complementary PWM signal. Such replacement also applies to other sequence diagrams described herein.

Figure 9:
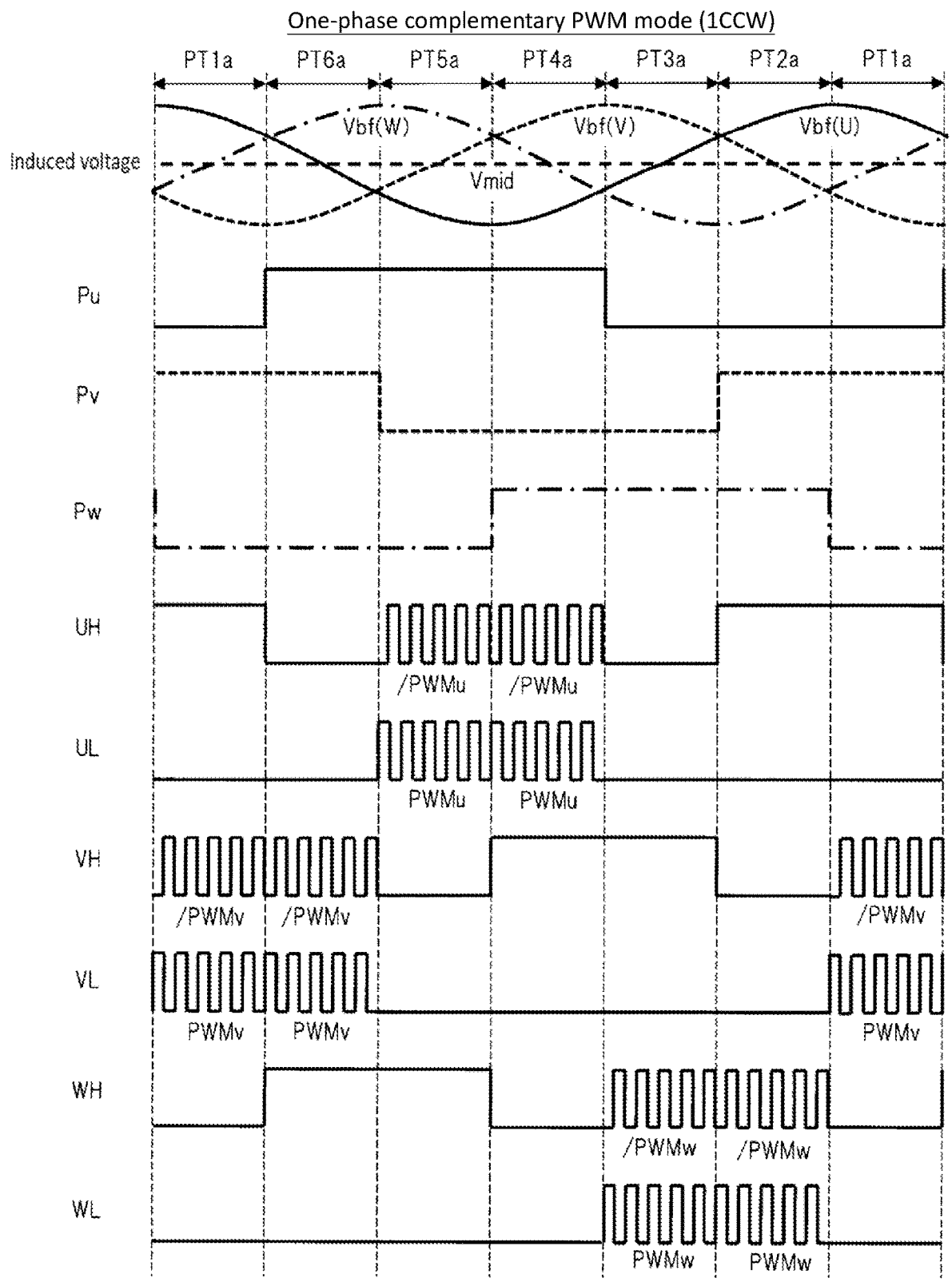
FIG. 9 is a sequence diagram showing an operation example of the one-phase complementary PWM control part in FIG. 7 at the time of CCW.

In FIG. 9, the same energization patterns PT1a to PT6a as in the case of FIG. 8 are used, but due to the difference in the rotation direction of the motor MT, the generation sequence of the position detection signals Pu, Pv, and Pw and the corresponding selection sequence of the energization patterns PT1a to PT6a are different. In FIG. 9, the one-phase complementary PWM control part 71 selects the energization pattern in the following sequence: energization pattern PT6a→PT5a→ . . . →PT2a→PT1a, which is reverse to the sequence in the case of FIG. 8.

(a) of FIG. 10 is a schematic view showing an operation example in a PWM-on period in FIG. 8, and (b) of FIG. 10 is a schematic view showing an operation example in a PWM-off period in FIG. 8. (a) and (b) of FIG. 10 show an operation example in a first half section (PT1a1) of the selected section of the energization pattern PT1a of FIG. 8. In the first half section (PT1a1), an induced voltage Vbf(W) of the w-phase, which is the non-energized phase, becomes positive (+) with respect to an intermediate voltage Vmid (=VDD/2).

In the PWM-on period Ton in (a) of FIG. 10, by controlling the upper switching element SWhu of the u-phase to be on and controlling the lower switching element SWlv of the v-phase to be on by the PWM signal PWMv, a driving current IDuv flows in the following path: the upper switching element SWhu→the motor MT→the lower switching element SWlv. Assuming that the on-resistance of the switching element is zero, the output terminal OUTu of the u-phase is clamped to the voltage (referred to as VDD for convenience) of the high-potential power supply VDD, and the output terminal OUTv of the v-phase is clamped to the voltage (e.g., 0V) of the low-potential power supply GND.

As a result, a midpoint voltage Vct of the motor MT becomes approximately VDD/2. The voltage of the output terminal OUTw of the w-phase, which is the non-energized phase, is a voltage obtained by adding the induced voltage Vbf(W) of the w-phase to the midpoint voltage Vct, and this voltage is in the range of VDD to 0V. Therefore, no current path is generated in the w-phase, and the output terminal OUTw of the w-phase is open.

In the PWM-off period Toff of (b) of FIG. 10, the lower switching element SWlv of the v-phase is controlled to be off by the PWM signal PWMv, and instead, the upper switching element SWhv of the v-phase is controlled to be on by the complementary PWM signal (/PWMv). As a result, with the electric power stored in coils Lu and Lv of the u-phase and the v-phase serving as the electromotive force, a return current IRuv flows in the following path: the upper switching element SWhu→the motor MT→the upper switching element SWhv. In this case, since the output terminal OUTv of the v-phase is clamped to the voltage of the high-potential power supply VDD, the midpoint voltage Vct of the motor MT is also substantially VDD.

A voltage obtained by adding the induced voltage Vbf(W) of the w-phase, which is positive (+), to the midpoint voltage Vct (=VDD) is outputted to the output terminal OUTw of the w-phase. When the induced voltage Vbf(W) is larger than a forward voltage (ΔV) of the freewheeling diode Dhw of the w-phase, a current (IBw1) flows in a path from the w-phase of the motor MT through the freewheeling diode Dhw. As a result, the voltage of the output terminal OUTw of the w-phase is clamped to a voltage obtained by adding the forward voltage (ΔV) of the freewheeling diode Dhw to the voltage of the high-potential power supply VDD. Since the current flowing through the output terminal OUTw of the w-phase flows in a direction consuming the induced voltage Vbf(W) of the w-phase (i.e., in a direction braking the rotation), it is a brake current IBw1.

Further, regarding the u-phase and the v-phase of the motor MT, by an induced voltage Vbf(U) and an induced voltage Vbf(V), a brake current IBvu1 flows in a direction consuming the induced voltage Vbf(U) and the induced voltage Vbf(V) (a direction braking the rotation). The brake current IBvu1 is superimposed on the return current IRuv and acts in a direction reducing the return current IRuv.

(a) of FIG. 11 is a schematic view showing an operation example in a PWM-on period different from (a) of FIG. 10, and (b) of FIG. 11 is a schematic view showing an operation example in a PWM-off period different from (b) of FIG. 10. (a) and (b) of FIG. 11 show an operation example in a latter half section (PT1a2) of the selected section of the energization pattern PT1a of FIG. 8. In the latter half section (PT1a2), the induced voltage Vbf(W) of the w-phase, which is the non-energized phase, becomes negative (−) with respect to the intermediate voltage Vmid (=VDD/2).

In the PWM-on period Ton of (a) of FIG. 11, the same operation as in the case of (a) of FIG. 10 is performed. However, the polarity of the induced voltage Vbf(W) in the w-phase is different from that in the case of (a) of FIG. 10. Even in this case, the voltage of the output terminal OUTw of the w-phase, which is the non-energized phase, is in the range of VDD to 0V, as in the case of (a) of FIG. 10. Therefore, no current path is generated in the w-phase, and the output terminal OUTw of the w-phase is open.

In the PWM-off period Toff of (b) of FIG. 11, similar to the case of (b) of FIG. 10, the return current IRuv flows in the following path: the upper switching element SWhu→the motor MT→the upper switching element SWhv. As a result, the midpoint voltage Vct of the motor MT becomes substantially VDD, as in the case of (b) of FIG. 10. A voltage obtained by adding the induced voltage Vbf(W) of the w-phase, which is negative (−), to the midpoint voltage Vct (VDD) is outputted to the output terminal OUTw of the w-phase. As a result, the voltage of the output terminal OUTw of the w-phase may be a voltage lower than the voltage of the high-potential power supply VDD. In this case, the brake current IBw1 as in the case of (b) of FIG. 10 does not flow. The brake current IBvu1 in the u-phase and the v-phase is the same as in the case of (b) of FIG. 10.

<Operation of Non-Complementary PWM Control Part>

FIG. 12 is a sequence diagram showing an operation example of the non-complementary PWM control part in FIG. 7 at the time of CW. The non-complementary PWM control part 70 performs an operation shown in FIG. 12 when receiving the activation signal NCW. In FIG. 12, similar to the case of FIG. 8, the non-complementary PWM control part 70 performs control of sequentially switching each of energization patterns PT1c to PT6c according to the position detection signals Pu, Pv, and Pw. In each of the energization patterns PT1c to PT6c, similar to the case of FIG. 8, the non-complementary PWM control part 70 controls the lower switching element SWl in the remaining one phase of the two energized phases by the PWM signal; however, different from the case of FIG. 8, the non-complementary PWM control part 70 controls the upper switching element SWh in the remaining one phase to be off, instead of controlling it by the complementary PWM signal.

For example, taking the energization pattern PT1c as an example, the lower switching element SWlv of the v-phase, which is the driving side of the energized phase, is PWM-controlled by the switching signal VL which is the PWM signal PWMv, but the upper switching element SWhv of the v-phase, which is the return side of the energized phase, is controlled to be off by the switching signal VH which becomes the "L" level. When the energization mode (NCW) of FIG. 12 is used, for example, the brake current IBw1 of the w-phase as seen in (b) of FIG. 10 and (b) of FIG. 11 is the same as in the case of (b) of FIG. 10 and (b) of FIG. 11.

On the other hand, the return current IRuv as seen in (b) of FIG. 10 and (b) of FIG. 11 flows through the freewheeling diode Dhv instead of the upper switching element SWhv of the v-phase. Since the current path in the direction from the high-potential power supply VDD to the output terminal OUTv of the v-phase is cut off due to the upper switching element SWhv of the v-phase being off, it becomes difficult for the brake current IBvu1 associated with the induced voltages Vbf(U) and Vbf(V) of the u-phase and the v-phase to flow.

As a result, when the energization mode (NCW) without complementary PWM shown in FIG. 12 is used, the braking force of the motor MT is weaker than that in the case of using the energization mode (1CW) of one-phase complementary PWM control shown in FIG. 8.

Although not shown, when receiving the activation signal NCCW, similar to the case of FIG. 8 and FIG. 12, the non-complementary PWM control part 70 operates using an energization pattern such that a portion of the complementary PWM signals (/PWM (u, v, w)) in FIG. 9 is changed to the "L" level.

<Configuration and Problem of Motor Control Device (Comparative Example)>

Here, a motor control device as a comparative example has a configuration in which, for example, a short brake control part is provided instead of the two-phase complementary PWM control part 72 in FIG. 7. (a) and (b) of FIG. 21 are views showing an example of a problem when the motor control device of the comparative example is used. In (a) of FIG. 21, the sliding door 13 is driven in the opening direction as the vehicle 10 is stopped on a steep upward slope. In (b) of FIG. 21, the sliding door 13 is driven in the closing direction as the vehicle 10 is stopped on a steep downward slope. In the case of (a) of FIG. 21, the sliding door 13 accelerates in the opening direction due to the relationship between the upward slope and gravity, and in the case of (b) of FIG. 21, the sliding door 13 accelerates in the closing direction due to the relationship between the downward slope and gravity.

When the sliding door 13 accelerates due to the slope in this manner, in some cases, the excessive speed in which the rotation speed ω of the motor MT is greater than the target rotation speed ω* of the motor MT cannot be sufficiently suppressed, and the speed control of the sliding door 13 cannot be performed with high accuracy. Therefore, similar to the case of Patent Document 1, it is conceivable to perform short brake control by the short brake control part when excessive speed occurs. By controlling the upper switching elements SWh of the three phases to be all on, or controlling the lower switching elements SWl of the three phases to be all on, the short brake control is a control that constructs a closed loop circuit consuming the induced voltage of the motor MT to decelerate the motor MT.

However, using short brake control, since a strong braking force acts, for example, there is a risk that pinching of the sliding door 13 or the like may be detected (i.e., erroneous detection occurs) due to this braking force. On the other hand, if short brake control is not performed, with the one-phase complementary PWM control part 71 (corresponding to the complementary PWM control of Patent Document 1), in particular, when the weight of the sliding door 13 is heavy, the braking force may be insufficient, and the speed control may not be performed with high accuracy. In other words, when the short brake control part is used to compensate for the lack of braking force associated with the one-phase complementary PWM control part 71, the braking force may become excessive. Further, since the one-phase complementary PWM control part 71 and the short brake control part differs significantly in terms of the control method in addition to the strength of such braking force, complication of the control may occur.

<Operation of Two-Phase Complementary PWM Control Part>

FIG. 13 is a sequence diagram showing an operation example of the two-phase complementary PWM control part in FIG. 7 at the time of CW. FIG. 14 is a sequence diagram showing an operation example of the two-phase complementary PWM control part in FIG. 7 at the time of CCW. The two-phase complementary PWM control part 72 performs the operation of FIG. 13 when receiving the activation signal 2CW, and performs the operation of FIG. 14 when receiving the activation signal 2CCW. In FIG. 13 and FIG. 14, similar to the case of the one-phase complementary PWM control part 71 described with reference to FIG. 8 and FIG. 9, the two-phase complementary PWM control part 72 performs control of sequentially switching each of energization patterns PT1$b$ to PT6$b$ according to the position detection signals Pu, Pv, and Pw.

In other words, in each of the energization patterns PT1$b$ to PT6$b$ shown in FIG. 13 and FIG. 14, the two-phase complementary PWM control part 72 controls the upper switching element SWh in one of the two energized phases to be on, and controls the lower switching element SWl and the upper switching element SWh in the remaining one phase respectively by the PWM signal and the complementary PWM signal. However, in the non-energized phase, similar to the case of FIG. 8 and FIG. 9, the two-phase complementary PWM control part 72 controls the lower switching element SWl to be off, but different from the case of FIG. 8 and FIG. 9, the two-phase complementary PWM control part 72 controls the upper switching element SWh by the complementary PWM signal, instead of controlling it to be off.

Taking the energization pattern PT1$b$ of FIG. 13 as an example, the two-phase complementary PWM control part 72 controls the upper switching element SWhu of the u-phase, which is the energized phase (u-phase→v-phase), to be on by the switching signal UH which becomes the "H" level, and PWM-controls the lower switching element SWlv of the v-phase, which is the driving side of the energized phase, by the switching signal VL which is the PWM signal PWMv. Further, the two-phase complementary PWM control part 72 PWM-controls the upper switching element SWhv of the v-phase, which is the return side of the energized phase, by the switching signal VH which is the complementary PWM signal (/PWMv).

Further, the two-phase complementary PWM control part 72 controls the lower switching element SWlw of the w-phase, which is the non-energized phase, by the switching signal WL which becomes the "L" level, and, on the other hand, PWM-controls the upper switching element SWhw of the w-phase by the switching signal WH which is the complementary PWM signal (/PWMv). The complementary PWM signal (/PWMv) is the signal used in the upper switching element SWhv of the v-phase, and the upper switching element SWhw of the w-phase is controlled by a signal which is the same as the complementary PWM signal (/PWMv) of the v-phase.

(a) of FIG. 15 is a schematic view showing an operation example in the PWM-on period in FIG. 13, and (b) of FIG. 15 is a schematic view showing an operation example in the PWM-off period in FIG. 13. (a) and (b) of FIG. 15 show an operation example in a first half section (PT1$b$1) of the selected section of the energization pattern PT1$b$ of FIG. 13. In the first half section (PT1$b$1), the induced voltage Vbf(W) of the w-phase, which is the non-energized phase, becomes positive (+) with respect to the intermediate voltage Vmid (=VDD/2).

In the PWM-on period Ton of (a) of FIG. 15, since the upper switching element SWhw of the w-phase is controlled to be off by the complementary PWM signal (/PWMv), the same operation as in the case of the one-phase complementary PWM control part 71 in (a) of FIG. 10 is performed. On the other hand, in the PWM-off period Toff of (b) of FIG. 15, different from the case of (b) of FIG. 10, the upper switching element SWhw of the w-phase is controlled to be on by the complementary PWM signal (/PWMv). Accordingly, the output terminal OUTw of the w-phase is clamped to the voltage of the high-potential power supply VDD via the upper switching element SWhw of the w-phase.

As a result, in the w-phase, a brake current IBw2 immediately flows through the upper switching element SWhw of the w-phase according to the induced voltage Vbf(W). On the other hand, in the case of (b) of FIG. 10, in the w-phase, the brake current IBw1 flows through the freewheeling diode Dhw only when the induced voltage Vbf(W) is larger than the forward voltage (ΔV) of the freewheeling diode Dhw (i.e., when the rotation speed of the motor MT is high). Therefore, the magnitude of the brake current IBw2 becomes sufficiently larger than the brake current IBw1, including the difference in on-resistance between the upper switching element SWhw and the freewheeling diode Dhw. The brake current IBvu1 of the u-phase and the v-phase is the same as in the case of (b) of FIG. 10.

(a) of FIG. 16 is a schematic view showing an operation example in a PWM-on period different from (a) of FIG. 15, and (b) of FIG. 16 is a schematic view showing an operation example in a PWM-off period different from (b) of FIG. 15. (a) and (b) of FIG. 16 show an operation example in a latter half section (PT1$b$2) of the selected section of the energization pattern PT1$b$ of FIG. 13. In the latter half section (PT1$b$2), the induced voltage Vbf(W) of the w-phase, which is the non-energized phase, becomes negative (−) with respect to the intermediate voltage Vmid (=VDD/2).

In the PWM-on period Ton of (a) of FIG. 16, the same operation as in the case of (a) of FIG. 15 is performed. However, the polarity of the induced voltage Vbf(W) of the w-phase is different from that in the case of (a) of FIG. 15. On the other hand, in the PWM-off period Toff of (b) of FIG. 16, different from the case of the one-phase complementary PWM control part 71 in (b) of FIG. 11, the upper switching element SWhw of the w-phase is controlled to be on by the complementary PWM signal (/PWMv). Accordingly, the output terminal OUTw of the w-phase is clamped to the voltage of the high-potential power supply VDD via the upper switching element SWhw of the w-phase.

As a result, in the w-phase, a brake current IBw3 immediately flows through the upper switching element SWhw of the w-phase according to the induced voltage Vbf(W). In contrast, in the case of (b) of FIG. 11, in the w-phase, since the upper switching element SWhw is off, the current path in the direction from the high-potential power supply VDD to the output terminal OUTw is cut off, and the brake current does not flow. The brake currents IBvu1 of the u-phase and the v-phase is the same as in the case of (b) of FIG. 11.

As can be seen from the above description, when the energization mode (2CW, 2CCW) of the two-phase complementary PWM control shown in FIG. 13 and FIG. 14 is used, the braking force of the motor MT becomes stronger as compared with the case of using the energization mode (1CW, 1CCW) of the one-phase complementary PWM control shown in FIG. 8 and FIG. 9. As a result, even without using short brake control such as the motor control device of the comparative example described with reference to (a) and (b) of FIG. 21, the motor MT can be sufficiently braked, and the speed control of the sliding door 13 can be performed with high accuracy.

The strength of braking force is ranked as follows: short brake control>two-phase complementary PWM control>one-phase complementary PWM control. Therefore, if two-phase complementary PWM control is used in place of the short brake control, an appropriate braking force that is not excessive can be obtained based on the one-phase complementary PWM control, and erroneous detection such as pinching of the sliding door 13 can be prevented. Further, since the difference in the braking force and the control method between the two-phase complementary PWM control and the one-phase complementary PWM control is small as compared to the case of the short brake control and the one-phase complementary PWM control, it is possible to realize ease of control.

Further, for example, in the energization mode of the two-phase complementary PWM control shown in FIG. 13, when the PWM duty ratio (D) is reduced, a state in which the upper switching elements SWh of the three phases are all on is approximated as a result. The state in which the upper switching elements SWh of the three phases are all on is a state which is the same as in the case of the short brake control. Therefore, when the two-phase complementary PWM control is used, it is possible to substantially continuously and variably control the braking force approximating the braking force obtained during the short brake control.

<Operation of Energization Mode Control Part>

FIG. 17 is a state transition view showing an operation example of a main part of the energization mode control part in FIG. 5. In FIG. 17, when receiving the closing command signal CLS from the operation switch OSW, the energization mode control part 56 shifts to a one-phase complementary PWM mode (S1a) of the CW direction. In response to this, the energization mode control part 56 activates the one-phase complementary PWM control part 71 by outputting the activation signal 1CW to the PWM control part 58. In this state, the energization mode control part 56 receives the command value 67 of the PWM duty ratio (D) from the speed control part 57.

Then, when the energization-on ratio (i.e., the PWM duty ratio (D)) based on the command value 67 drops lower than a threshold value (first threshold value) Du2, the energization mode control part 56 transitions to a two-phase complementary PWM mode (S2a) of the CW direction. In this case, the energization mode control part 56 activates the two-phase complementary PWM control part 72 in place of the one-phase complementary PWM control part 71 by outputting the activation signal 2CW to the PWM control part 58.

On the other hand, when the PWM duty ratio (D) based on the command value 67 exceeds a threshold value (second threshold value) Dd2 in the state of the two-phase complementary PWM mode (S2a) of the CW direction, the energization mode control part 56 transitions to the one-phase complementary PWM mode (S1a) of the CW direction. In this case, the energization mode control part 56 activates the one-phase complementary PWM control part 71 in place of the two-phase complementary PWM control part 72 by outputting the activation signal 1CW to the PWM control part 58.

Further, when the PWM duty ratio (D) based on the command value 67 exceeds a threshold value (third threshold value) Dd1 larger than the threshold value (second threshold value) Dd2 in the state of the one-phase complementary PWM mode (S1a) of the CW direction, the energization mode control part 56 transitions to a non-complementary PWM mode (S0a) of the CW direction. In this case, the energization mode control part 56 activates the non-complementary PWM control part 70 in place of the one-phase complementary PWM control part 71 by outputting the activation signal NCW to the PWM control part 58.

On the other hand, when the PWM duty ratio (D) based on the command value 67 drops lower than a threshold value (fourth threshold value) Du1 larger than the threshold value (first threshold value) Du2 in the state of the non-complementary PWM mode (S0a) of the CW direction, the energization mode control part 56 transitions to the one-phase complementary PWM mode (S1a) of the CW direction. In this case, the energization mode control part 56 activates the one-phase complementary PWM control part 71 in place of the non-complementary PWM control part 70 by outputting the activation signal 1CW to the PWM control part 58.

Similarly, when receiving the opening command signal OP from the operation switch OSW, the energization mode control part 56 shifts to a one-phase complementary PWM mode (S1b) of the CCW direction. Afterwards, the energization mode control part 56 receives the command value 67 of the PWM duty ratio (D) from the speed control part 57, and the state transitions between the one-phase complementary PWM mode (S1b), a two-phase complementary PWM mode (S2b), and a non-complementary PWM mode (S0b) of the CCW direction, based on threshold values that are the same as in the case of the CW direction described above.

Here, the PWM duty ratio (D) means that the smaller the value is, the less the driving force is required whereas the larger the braking force is required. Therefore, when a large braking force is required, the two-phase complementary PWM mode (S2a, S2b) is used. On the other hand, the PWM duty ratio (D) means that the larger the value is, the larger the driving force is required whereas the less the braking force is required. Therefore, when the braking force is not required, the non-complementary PWM mode (S0a, S0b) is used.

Further, in this example, the threshold value (second threshold value) Dd2 (e.g., 45%) is set to a value larger than the threshold value (first threshold value) Du2 (e.g., 35%), and the threshold value (third threshold value) Dd1 (e.g., 65%) is set to a value larger than the threshold value (fourth threshold value) Du1 (e.g., 55%). By imparting a hysteresis characteristic to the threshold values in this manner, it is possible to prevent frequent switching of the energization mode and stabilize the control. For example, when the PWM duty ratio (D) drops below 35% and then fluctuates around 35%, the operation in the two-phase complementary PWM mode (S2a, S2b) can be maintained without switching to the one-phase complementary PWM mode (S1a, S1b).

In place of the command value 67 of the PWM duty ratio (D), the energization mode control part 56 may determine, for example, whether the state in which the rotation speed co exceeds the target rotation speed ω* continues for a predetermined time period by using a timer or the like, and when it continues for the predetermined time period, the energization mode control part 56 may perform control to transition to an energization mode having a stronger braking force. Even when such a method is used, substantially the same control as in the case of using the command value 67 may be performed. In other words, with PI compensation, the value of the command value 67 changes depending on the magnitude of the error between the rotation speed co of the motor MT and the target rotation speed ω* and how long this error continues due to the integration delay.

<Main Effect of Embodiment 1>

As described above, by using the motor control device of Embodiment 1, it is possible to control the speed of the opening/closing body with high accuracy. In particular, even when the weight of the opening/closing body is heavy, the speed control of the opening/closing body can be performed with high accuracy. In addition, it is not necessary to use complicated control such as short brake control, and the control can be simplified.

Embodiment 2

<Prerequisite Problem>

In Embodiment 1, the control when driving opening and closing of the sliding door 13 has been described; in Embodiment 2, the control when fixing the position of the sliding door 13 at a position in the middle of opening and closing will be described. For example, as shown in (a) and (b) of FIG. 21, it is assumed that, with the vehicle 10 stopped on a slope, the sliding door 13 is opened/closed and stopped at a position in the middle of opening and closing, and the position of the sliding door 13 (i.e., the rotation position of the motor MT) is fixed at the position in the middle of the opening and closing.

As a control method of this case, short brake control may be mentioned. When the short brake control is used, the rotation position of the motor MT may be fixed at low power consumption since a through current does not flow. However, there is a risk that the braking force may be insufficient for fixing the rotation position of the motor MT on the slope where the sliding door 13 is accelerated. Therefore, as another control method, one-phase energization control in which two predetermined phases of three phases are fixedly energized may be mentioned. When the one-phase energization control is used, a strong braking force may be obtained. However, there is a risk that the power consumption when fixing the rotation position may increase.

<Configuration of PWM Control Part>

FIG. 18 is a schematic view showing a configuration example of a main part of the PWM control part in FIG. 5 in a motor control device according to Embodiment 2 of the disclosure. In a PWM control part 58b of FIG. 18, when the position (rotation position of the motor MT) of the sliding door (opening/closing body) 13 is fixed in the middle of opening and closing, the upper switching elements SWh of the three phases and the lower switching elements SWl of the three phases are PWM-controlled based on an energization pattern in which two of the three phases are energized phases, and the remaining one phase is a non-energized phase. In other words, the PWM control part 58b continuously energizes the motor MT by using a predetermined one of the six energization patterns used in the 120° energization mode. Accordingly, the PWM control part 58b fixes the rotation position of the motor MT in a direction corresponding to the energization direction of the energized phase.

Specifically, the PWM control part 58b of FIG. 18 has a configuration in which a position-fixing PWM control part 75 is added to the configuration example of FIG. 7. The position-fixing PWM control part 75 is activated according to an activation signal FX in the energization mode selection signal 66. For example, when receiving the stop command signal STP from the operation switch OSW, or when it becomes necessary to forcibly stop the motor MT in the middle of opening and closing due to various protection functions (not shown), the energization mode control part 56 of FIG. 5 outputs the activation signal FX to the PWM control part 58b.

<Operation of Position-Fixing PWM Control Part>

(a) of FIG. 19 is a sequence diagram showing an operation example of the position-fixing PWM control part in FIG. 18, and (b) of FIG. 19 is a schematic view showing an example of the motor current associated with the operation of (a) of FIG. 19. In one phase of the two energized phases, the position-fixing PWM control part 75 controls one of the upper switching element SWh and the lower switching element SWl by the PWM signal, and controls the other by the complementary PWM signal. Further, in the non-energized phase, the position-fixing PWM control part 75 controls one of the upper switching element SWh and the lower switching element SWl to be off, and controls the other by the complementary PWM signal.

In the example of (a) of FIG. 19, an energization pattern PT1d which is the same as the energization pattern PT1b from the u-phase to the v-phase used in the two-phase complementary PWM control shown in FIG. 13 is used. Of course, any of the other energization patterns PT2b to PT6b may also be used. Here, when the rotation position of the motor MT is fixed by the one-phase energization control, for example, it is also conceivable to use the energization pattern PT1a of the one-phase complementary PWM control shown in FIG. 8 or the energization pattern PT1c of the non-complementary PWM control shown in FIG. 12, but here, the energization pattern PT1b of the two-phase complementary PWM control is used.

In (b) of FIG. 19, in the PWM-on period Ton, the driving current IDuv flows from the upper switching element SWhu of the u-phase toward the lower switching element SWlv of the v-phase via the motor MT. On the other hand, in the PWM-off period Toff, the return current IRuv flows from the upper switching element SWhu of the u-phase toward the upper switching element SWhv of the v-phase via the motor MT. The average current of the driving current IDuv and the return current IRuv is a motor current Imt. Further, the PWM duty ratio (D) may be fixedly determined in advance, or may also be generate by the speed control part 57 by setting the target rotation speed ω* to zero in FIG. 5.

(a) of FIG. 20 is a schematic view showing an operation example in the PWM-on period in (a) and (b) of FIG. 19, and (b) of FIG. 20 is a schematic view showing an operation example in the PWM-off period in (a) and (b) of FIG. 19. In the PWM-on period Ton of (a) of FIG. 20, the driving current IDuv flows from the upper switching element SWhu of the u-phase toward the lower switching element SWlv of the v-phase via the motor MT. A magnetic flux Φuv is generated according to the direction of the driving current IDuv, and the rotor RT is fixed along the direction of the magnetic flux Φuv. The force for fixing the rotor RT (i.e., braking force) becomes stronger as the driving current IDuv (magnetic flux Φuv) increases.

In the PWM-off period Toff of (b) of FIG. 20, the return current IRuv flows from the upper switching element SWhu of the u-phase toward the upper switching element SWhv of the v-phase via the motor MT. The fixed state of the rotor RT is maintained by the magnetic flux Φuv associated with the return current IRuv. Here, if the rotor RT rotates due to insufficient braking force, an induced voltage is generated in each phase. At this time, as described in Embodiment 1 (FIG. 15, FIG. 16, etc.), in the w-phase, which is the non-energized phase, when the one-phase complementary PWM control is used, it becomes difficult to sufficiently flow the brake current, but when the two-phase complementary PWM control is used, a brake current IBw4 can be sufficiently flowed.

Accordingly, by using the two-phase complementary PWM control when fixing the rotation position of the motor MT, a stronger braking force can be obtained as compared to the case of using the one-phase complementary PWM control, and as a result, the driving current IDuv (PWM duty ratio (D)) can be made smaller than in the case of using the one-phase complementary PWM control. In addition, by using the two-phase complementary PWM control, since a stronger braking force can be obtained as compared to the case of using the non-complementary PWM control, and diode loss due to the return current IRuv does not occur, the driving current IDuv (PWM duty ratio (D)) can be made smaller than in the case of using the non-complementary PWM control.

<Main Effect of Embodiment 2>

As described above, by using the motor control device of Embodiment 2, it is possible to reduce the power consumption when fixing the rotation position of the motor. In particular, even when the weight of the opening/closing body is heavy, low power consumption can be realized.

Obviously, the disclosure is not limited to the above-described embodiments, and various modifications may be made without departing from the gist thereof. For example, in the above embodiments, an example of application to a power sliding door has been shown, but it is similarly applicable to all motor control devices targeting various opening/closing bodies including power tailgates, power windows, and the like. Among them, it is particularly useful when applied to a power sliding door or a power tailgate which has a heavy opening/closing body and is easily affected by an inclined state when the vehicle is stopped.

In addition, the material, shape, dimensions, number, installation location, etc. of each component in each of the above embodiments are arbitrary as long as the disclosure can be achieved and are not limited to the above embodiments.

What is claimed is:

1. A motor control device, which is a motor control device controlling rotation of an electric motor that drives opening and closing of an opening/closing body of a vehicle, the motor control device comprising:
    upper switching elements of three phases, respectively connected between a high-potential power supply and output terminals of the three phases connected to the electric motor;
    lower switching elements of the three phases, respectively connected between the output terminals of the three phases and a low-potential power supply;
    a rotation detection part that detects a rotation position and a rotation speed of the electric motor;
    a speed control part that outputs a command value of a PWM duty ratio based on an error between the rotation speed detected by the rotation detection part and a predetermined target rotation speed; and
    a PWM control part that, when driving opening and closing of the opening/closing body, receives the rotation position from the rotation detection part and the command value from the speed control part, and PWM-controls the upper switching elements of the three phases and the lower switching elements of the three phases based on an energization mode that sequentially switches among energized phases, which are two of the three phases, and a non-energized phase, which is a remaining one phase,
    wherein the PWM control part has a two-phase complementary PWM control part that
        in one of the energized phases, controls one of the upper switching element and the lower switching element by a PWM signal, and controls the other by a complementary PWM signal having a polarity opposite to the PWM signal, and
        in the non-energized phase, controls one of the upper switching element and the lower switching element to be off, and controls the other by the complementary PWM signal.

2. The motor control device according to claim 1, wherein the PWM control part has a one-phase complementary PWM control part that
    in one of the energized phases, controls one of the upper switching element and the lower switching element by the PWM signal, and controls the other by the complementary PWM signal, and
    in the non-energized phase, controls the upper switching element and the lower switching element to be off.

3. The motor control device according to claim 2, comprising an energization mode control part that
    upon receiving the command value from the speed control part, activates the two-phase complementary PWM control part in place of the one-phase complementary PWM control part when an energization-on ratio based on the command value drops lower than a first threshold value, and
    activates the one-phase complementary PWM control part in place of the two-phase complementary PWM control part when the energization-on ratio exceeds a second threshold value.

4. The motor control device according to claim 3, wherein the second threshold value is larger than the first threshold value.

5. The motor control device according to claim 2, wherein the PWM control part has a non-complementary PWM control part that
    in one of the energized phases, controls one of the upper switching element and the lower switching element by the PWM signal, and controls the other to be off, and
    in the non-energized phase, controls the upper switching element and the lower switching element to be off.

6. The motor control device according to claim 5, comprising an energization mode control part that
    upon receiving the command value from the speed control part, activates the two-phase complementary PWM control part in place of the one-phase complementary PWM control part when an energization-on ratio based on the command value drops lower than a first threshold value, activates the one-phase complementary PWM control part in place of the two-phase complementary PWM control part when the energization-on ratio exceeds a second threshold value, activates the non-complementary PWM control part in place of the one-phase complementary PWM control part when the energization-on ratio exceeds a third threshold value larger than the second threshold value, and activates the one-phase complementary PWM control part in place of the non-complementary PWM control part when the energization-on ratio drops lower than a fourth threshold value larger than the first threshold value.

7. The motor control device according to claim 6, wherein the second threshold value is larger than the first threshold value, and the third threshold value is larger than the fourth threshold value.

8. A motor control device, which is a motor control device controlling rotation of an electric motor that drives opening and closing of an opening/closing body of a vehicle, the motor control device comprising:

upper switching elements of three phases, respectively connected between a high-potential power supply and output terminals of the three phases connected to the electric motor;

lower switching elements of the three phases, respectively connected between the output terminals of the three phases and a low-potential power supply; and a PWM control part, wherein when fixing a position of the opening/closing body at a position in the middle of opening and closing, by PWM-controlling the upper switching elements of the three phases and the lower switching elements of the three phases based on an energization pattern in which two of the three phases are energized phases, and a remaining one phase is a non-energized phase, the PWM control part fixes a rotation position of the electric motor in a direction corresponding to an energization direction of the energized phases, wherein the PWM control part has a position-fixing PWM control part that in one of the energized phases, controls one of the upper switching element and the lower switching element by a PWM signal, and controls the other by a complementary PWM signal which has a polarity opposite to the PWM signal, and in the non-energized phase, controls one of the upper switching element and the lower switching element to be off, and controls the other by the complementary PWM signal.

9. The motor control device according to claim 8, comprising:

a rotation detection part that detects the rotation position and a rotation speed of the electric motor; and a speed control part that outputs a command value of a PWM duty ratio based on an error between the rotation speed detected by the rotation detection part and a predetermined target rotation speed, wherein the PWM control part has a two-phase complementary PWM control part, and when driving opening and closing of the opening/closing body, receives the rotation position from the rotation detection part and the command value from the speed control part, and PWM-controls the upper switching elements of the three phases and the lower switching elements of the three phases based on an energization mode that sequentially switches among the energized phases and the non-energized phase, and the two-phase complementary PWM control part in one of the energized phases, controls one of the upper switching element and the lower switching element by the PWM signal, and controls the other by the complementary PWM signal, and in the non-energized phase, controls one of the upper switching element and the lower switching element to be off, and controls the other by the complementary PWM signal.

\* \* \* \* \*